US008438315B1

(12) United States Patent
Tao et al.

(10) Patent No.: US 8,438,315 B1
(45) Date of Patent: May 7, 2013

(54) TECHNIQUES FOR NON-DISRUPTIVE UPGRADE

(75) Inventors: Tao Tao, Cambridge, MA (US); Harold M. Sandstrom, Belmont, MA (US); Helen S. Raizen, Jamaica Plain, MA (US); Michael E. Bappe, Loveland, CO (US); Edith Epstein, Arlington, MA (US); Eric I. West, Brighton, MA (US); Santhosh Venkatesh Kudva, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 113 days.

(21) Appl. No.: 12/924,588

(22) Filed: Sep. 30, 2010

Related U.S. Application Data

(63) Continuation-in-part of application No. 12/059,071, filed on Mar. 31, 2008, now Pat. No. 7,890,664.

(51) Int. Cl.
G06F 13/10 (2006.01)
G06F 9/44 (2006.01)

(52) U.S. Cl.
USPC .................................. 710/8; 710/5; 717/168

(58) Field of Classification Search .................. None
See application file for complete search history.

(56) References Cited

U.S. PATENT DOCUMENTS 6,658,489 B1 * 12/2003 Asselin ......................... 719/327
7,770,053 B1   8/2010 Bappe et al.
7,853,946 B2 * 12/2010 Minagawa ..................... 717/178

OTHER PUBLICATIONS

Ksplice, Inc., "200+ leading tech companies have made rebooting obsolete with Ksplice Uptrack", http://www.ksplice.com, Sep. 4, 2010.
Ksplice, Inc., "200+ leading tech companies have made rebooting obsolete with Ksplice Uptrack", http://www.ksplice.com/why, Sep. 4, 2010.
Ksplice, Inc., "200+ leading tech companies have made rebooting obsolete with Ksplice Uptrack", http://www.ksplice.com/features, Sep. 4, 2010.
Rooney, Paula, "Ksplice automates hot patching Linux kernel with no reboot needed", Apr. 23, 2008.
Ksplice, Inc., "Technical paper", 2010.
Raizen, Helen S., et al., "Systems and Methods for Accessing Storage or Network Based Replicas of Encryped Volumes With No Additional Key Management", U.S. Appl. No. 12/242,690, filed Sep. 30, 2008.
Bappe, Michael E., et al., "Methods and Systems for Migrating Data With Minimal Disruption", U.S. Appl. No. 11/427,889, filed Jun. 30, 2006.
Raizen, Helen S., et al., "Methods and Systems for Managing I/O Requests to Minimize Disruption Required for Data Migration", U.S. Appl. No. 11/536,995, filed Sep. 29, 2006.

(Continued)

*Primary Examiner* — Ilwoo Park
(74) *Attorney, Agent, or Firm* — Muirhead and Saturnelli, LLC

(57) ABSTRACT

Described are techniques for upgrading a driver. A driver is installed which includes an upgrade facility, a base driver and a first set of one or more driver extension modules for processing input/output operations for one or more devices. Processing is performed to upgrade the driver using the upgrade facility. The processing includes loading one or more upgrade modules associated with a second version of said driver and performing cutover processing for each of the one or more devices.

20 Claims, 20 Drawing Sheets

OTHER PUBLICATIONS

Raizen, Helen S., et al., "Systems and Methods for Selective Encryption of Operating System Metadata for Host-Based Encryption of Data At Rest on a Logical Unit", U.S. Appl. No. 12/242,638, filed Sep. 30, 2008.

Raizen, Helen S., et al., "Efficient Read/Write Algorithms and Associated Mapping for Block-Level Data Reduction Processes", U.S. Appl. No. 12/642,071, filed Dec. 18, 2009.

Raizen, Helen S., et al., "Systems and Methods for Using Thin Provisioning to Reclaim Space Identified by Data Reduction Processes", U.S. Appl. No. 12/642,109, filed Dec. 18, 2009.

Raizen, Helen S., et al., "Systems and Methods for Accessing Storage or Network Based Replicas of Encrypted Volumes With No Additional Key Management", U.S. Appl. No. 12/346,412, filed Dec. 30, 2008.

* cited by examiner

TECHNIQUES FOR NON-DISRUPTIVE UPGRADE

RELATED APPLICATIONS

This application is a continuation in part of U.S. patent application Ser. No. 12/059,071, filed Mar. 31, 2008 now U.S. Pat. No. 7,890,664, METHODS AND APPARATUS FOR NON-DISRUPTIVE UPGRADE BY REDIRECTING I/O OPERATIONS, (the '071 application') which is incorporated by reference herein.

BACKGROUND

1. Technical Field

This application generally relates to drivers, and more particularly to techniques used for performing driver upgrades.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. Such storage devices and data storage systems are provided, for example, by EMC Corporation of Hopkinton, Mass. The host systems access the storage device through a plurality of channels provided therewith. Host systems provide data and access control information through the channels to the storage device and storage device provides data to the host systems also through the channels. The host systems do not address the disk drives of the storage device directly, but rather, access what appears to the host systems as a plurality of logical disk units, logical devices or logical volumes. The logical disk units may or may not correspond to the actual physical disk drives. Allowing multiple host systems to access the single storage device unit allows the host systems to share data stored therein.

An application may execute on a host where the application performs I/O (input/output) operations. Device drivers are used in connection with performing such I/O operations. When performing an upgrade to the driver, the applications which utilize the driver may have to be stopped and then restarted. Additionally, the system upon which the upgraded driver is installed may also have to be rebooted to use the upgraded driver. Requiring a reboot and stopping/restarting of the applications to use the upgraded driver may be unacceptable or undesirable in terms of impact on system operation.

The host may be able to transmit the data operation to the data storage system over any one or more different paths or multiple paths. One such driver may include multipathing functionality for managing use of such multiple I/O paths to a data storage system from the host upon which the application is executing. When a new multipathing driver upgrade, or more generally any driver upgrade, is needed, it may be necessary to install the upgraded driver, perform a reboot, and stop and restart the applications that use the driver functionality in order to have the applications use the upgraded driver.

SUMMARY OF THE INVENTION

In accordance with one aspect of the invention is a method of upgrading a driver comprising: installing a driver, said driver including an upgrade facility, a base driver and a first set of one or more driver extension modules for processing input/output operations for one or more devices, said driver using a first device configuration tree and first device stack in connection with processing input/output operations for said one or more devices with said first set of one or more driver extension modules corresponding to a first version of said driver; performing processing to upgrade said driver using said upgrade facility, said processing including: loading one or more upgrade modules associated with a second version of said driver; and performing cutover processing for each of said one or more devices and wherein, prior to completing said cutover processing for a first of said one or more devices, input/output operations directed to said first device are processed using said first device configuration tree and said first device stack with said first set of one or more driver extension modules corresponding to a first version of said driver, and after completing said cutover processing for said first device, input/output operations directed to said first device are processed using said second device configuration tree and said second device stack with a second set of driver extension modules, said second set including said one or more upgrade modules and being associated with said second version of said driver. The processing to upgrade said driver may include replacing a first of said driver extension modules in said first set with an upgraded first extension module. The processing to upgrade said driver may include adding an extension module which does not replace a corresponding extension module included in said first set. A first of said upgrade modules may be an internal filtering module which directs input/output operations for said one or more devices within said driver through said second device stack. The driver may be installed in a kernel of a computer system. The method may also include issuing a command from user mode to request said performing processing to upgrade said driver using said upgrade facility. Upgrade state information may be maintained regarding an upgrade state of said driver. The upgrade state information may indicates whether a driver upgrade is in progress. The upgrade state information may indicate whether cutover processing is in progress for each of said one or more devices. The upgrade state information may indicate whether input/output operations for each of said one or more devices are suspended. The upgrade state information may indicate whether to use said first device configuration tree and said first device stack or said second device configuration tree and said second device stack when processing input/output operations for each of said one or more devices. The cutover processing for a first of said one or more devices may include suspending input/output operations for said first device, draining input/output operations for said first device which use said first configuration tree and said first device stack, obtaining and updating runtime device configuration information for said first device, and resuming input/output operations for said first device using said second device configuration tree and said second device stack with said second set of driver extension modules. The first set of one or more driver extension modules may include an internal filtering module which directs input/output operations for said one or more devices within said driver through said first device stack. The first set may include a first driver extension module which registers with said internal filtering module enabling said internal filtering module to transfer control to said first driver extension module in connection with processing input/output operations for said one or more devices. The internal filtering module may register with said base driver enabling said base driver to transfer control to said internal filtering module when processing input/output operations for said one or more devices. Resources for said first device stack and said first configuration tree may be deallocated after completing said cutover processing for said one or more devices. The method may include unloading modules of said first set which are no longer in use in connection with said second version of said driver after upgrade of said driver to said second version is complete. If the upgrade state information indicates that an upgrade is in progress, changes to static configuration data may be suspended.

In accordance with another aspect of the invention is a computer readable medium comprising code stored thereon for upgrading a driver, the computer readable medium comprising code stored thereon for: installing a driver, said driver including an upgrade facility, a base driver and a first set of one or more driver extension modules for processing input/output operations for one or more devices, said driver using a first device configuration tree and first device stack in connection with processing input/output operations for said one or more devices with said first set of one or more driver extension modules corresponding to a first version of said driver; performing processing to upgrade said driver using said upgrade facility, said processing including: loading one or more upgrade modules associated with a second version of said driver; and performing cutover processing for each of said one or more devices and wherein, prior to completing said cutover processing for a first of said one or more devices, input/output operations directed to said first device are processed using said first device configuration tree and said first device stack with said first set of one or more driver extension modules corresponding to a first version of said driver, and after completing said cutover processing for said first device, input/output operations directed to said first device are processed using said second device configuration tree and said second device stack with a second set of driver extension modules, said second set including said one or more upgrade modules and being associated with said second version of said driver. The processing to upgrade said driver may include replacing a first of said driver extension modules in said first set with an upgraded first extension module.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
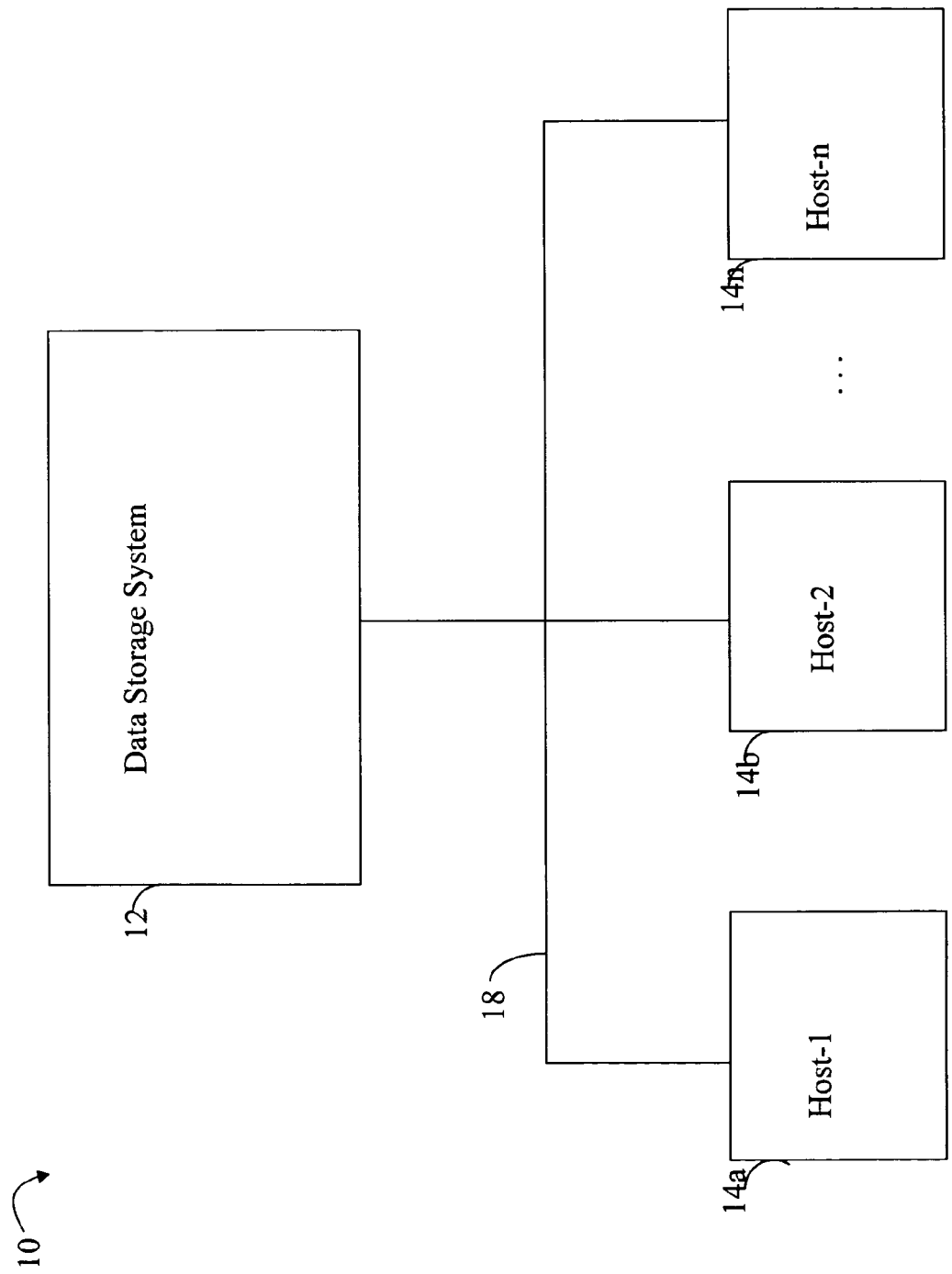
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI, Fibre Channel, or iSCSI, Fibre Channel over Ethernet, and the like. Some or all of the connections by which the hosts and data storage system 12 may be connected to the communication medium 18 may pass through other communication devices, such as those in the EMC® Connectrix® family or other switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as EMC's Symmetrix™ data storage system, as well one or more other data storage systems as may vary with embodiment.

Figure 2A:
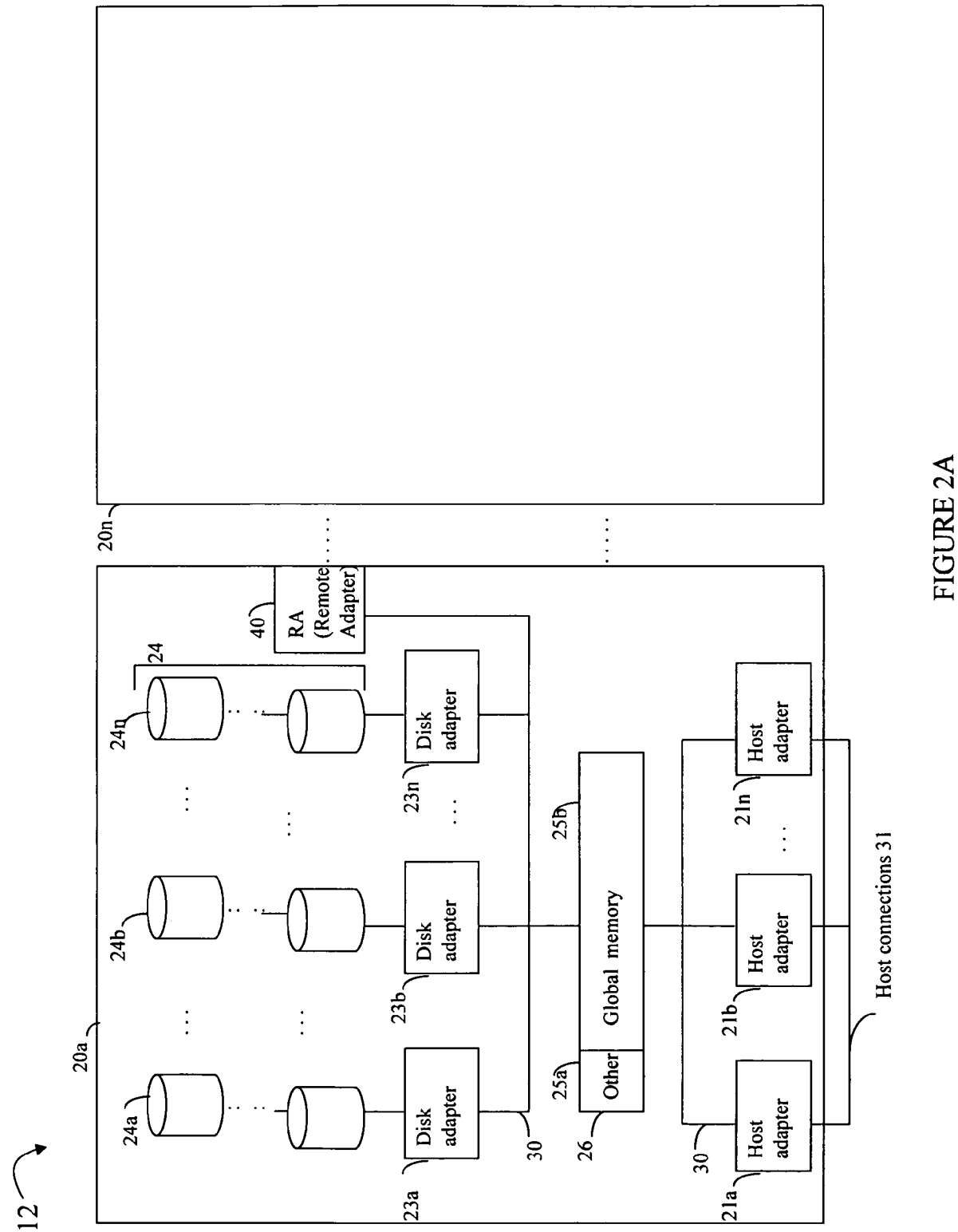
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also included as part of a storage area network (SAN) that includes, for example, other components.

Each of the data storage systems, such as 20a, may include a plurality of disk devices or volumes, such as the arrangement 24 consisting of n rows of disks or, more generally, data storage devices 24a-24n. In this arrangement, each row of disks may be connected to a disk adapter ("DA") or director responsible for the backend management of operations to and from a portion of the disks 24. In the system 20a, a single DA, such as 23a, may be responsible for the management of a row of disks such as row 24a. In a data storage system such as by EMC Corporation, a backend DA may also be referred to as a disk controller. The DA may performed operations such as reading data from, and writing data to, the physical devices which are serviced by the DA.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host may also be referred to as front end components. A component of the data storage system which communicates with a front end component may be characterized as a backend component. A DA is an example of such a backend component. In connection with data storage systems such as by EMC Corporation, various types of directors or adapters may be implemented as a processor, or, more generally, a component that includes the processor. Examples of directors are disk adapters (DAs), host adapters (HAs) and the like.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Also shown in the storage system 20a is an RA or remote adapter 40. The RA may be hardware including a processor used to facilitate communication between data storage systems, such as between two of the same or different types of data storage systems.

Host systems provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units also referred to as LUNs (logical unit numbers). The LUNs may or may not correspond to the actual or physical disk drives. For example, one or more LUNs may reside on a single physical disk drive. Data in a single storage system may be accessed by multiple hosts allowing the hosts to share the data residing therein.

The HAs may be used in connection with communications between a data storage system and a host system. The RAs may be used in facilitating communications between two data storage systems. The DAs may be used in connection with facilitating communications to the associated disk drive(s) and LUN(s) residing thereon. A LUN or logical unit number may be characterized as a disk array or data storage system reference to an amount of disk space that has been formatted and allocated for use to one or more hosts.

The DA performs I/O operations on a disk drive. Data residing on a LUN may be accessed by the DA following a data request in connection with I/O operations that other directors originate.

Figure 2B:
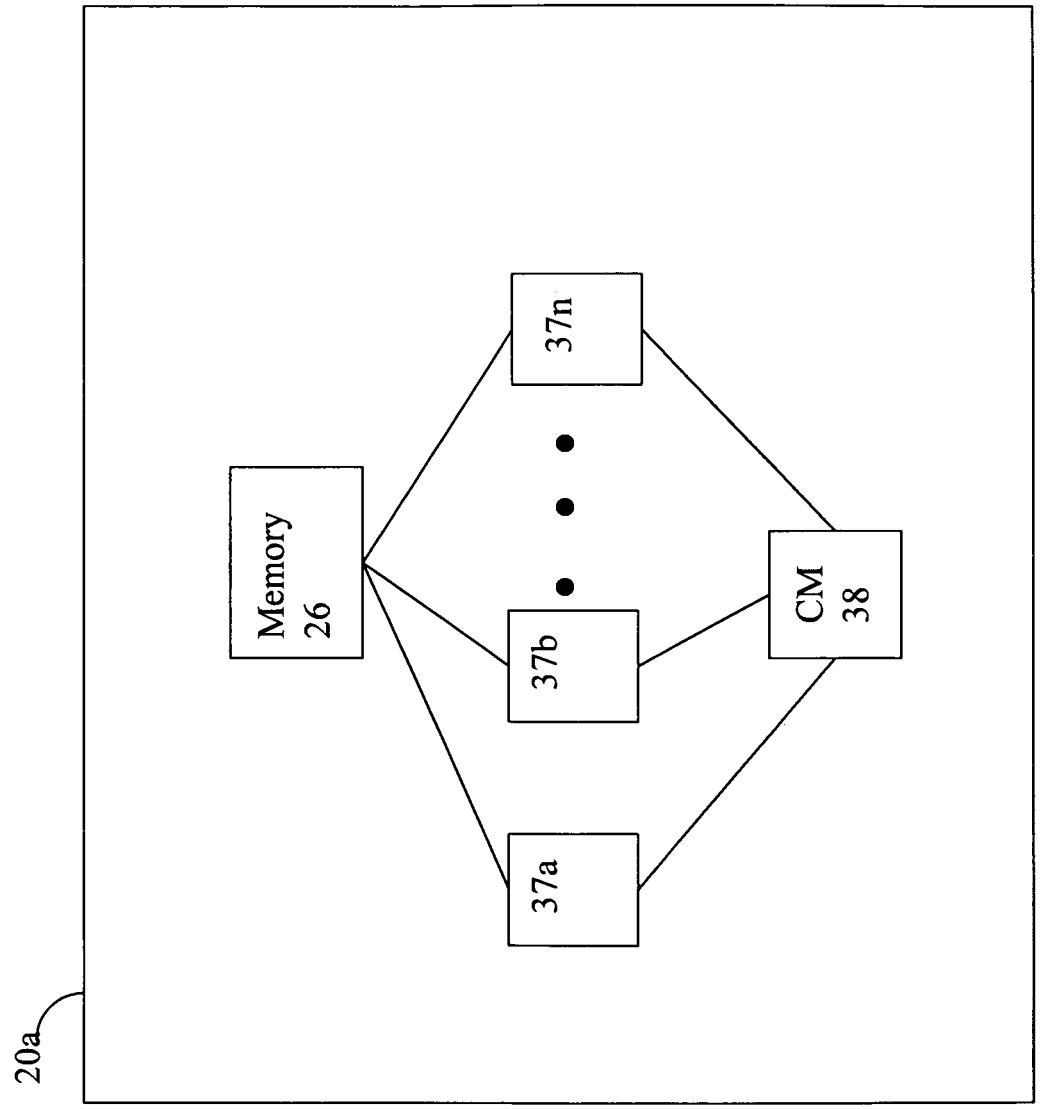
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different physical paths from the host to the data storage system. Described in the following paragraphs are techniques that may be used in connection with selecting a path over which to access data of a storage device when such data is accessible over multiple paths.

A host may use such techniques in connection with path selection when communicating data operations, such as I/O operations, to the data storage system.

Figure 3:
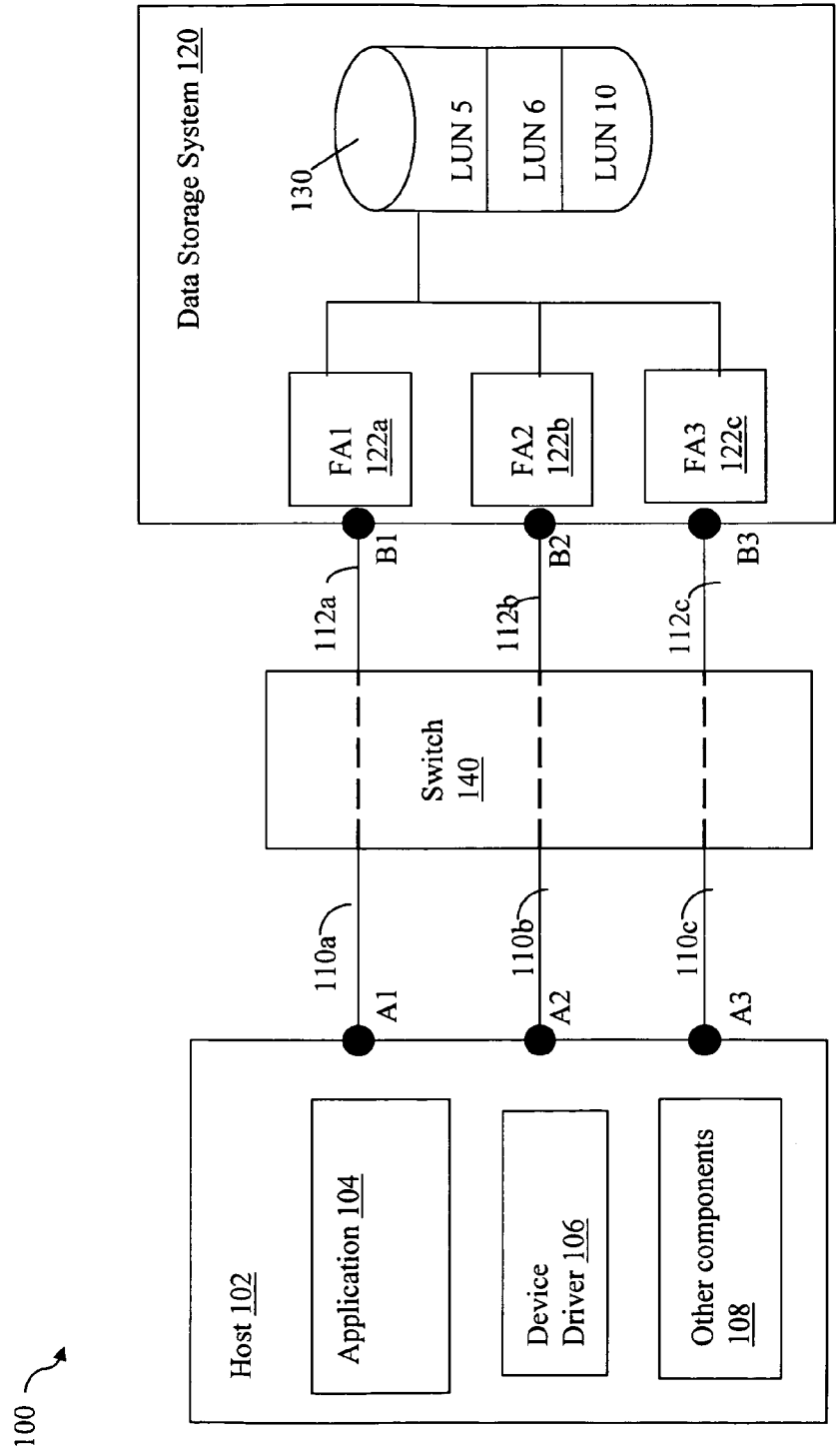
FIG. 3 is an example of a system that may be used in connection with techniques herein.

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. It should be noted that the example 100 includes only a single host, single data storage system, and a fabric including a single switch for purposes of simplicity to illustrate the techniques herein.

The host 102 may include an application 104, driver 106 and other components 108. An I/O operation from the application 104 may be communicated to the data storage system 120 using the driver 106 and one or more other components represented by element 108. The application 104 may be a database or other application which issues data operations, such as I/O operations, to the data storage system 120. Each of the I/O operations may be directed to a target device (such as device 130) configured to be accessible to the host 102 over multiple physical paths. As such, each of the I/O operations may be forwarded from the application 104 to the data storage system 120 over one of the possible multiple paths. The driver 106 may include functionality to perform any one or more different types of processing such as related to encryption, multipathing, mirroring, migration, and the like. For example, the driver 106 may perform processing to select one of the possible multiple paths based on one or more criteria such as, for example, load balancing, to distribute I/O requests for the target device across available active paths. Load balancing may be performed to provide for better resource utilization and increased performance of the host, data storage system, and network or other connection infrastructure. The driver 106 may be included in a commercially available product such as, for example, EMC® PowerPath® software by EMC Corporation. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the driver 106 and also below the driver 106. For example, application 104 may issue an I/O operation which is communicated in a call stack including an LVM, the driver 106, and an FC or SCSI driver.

The data storage system 120 may include one or more physical data storage devices, such as device 130, where each such device is configured into one or more LUNs as described above. Each of the LUNs of the device 130 may be configured to be accessible to the host through multiple paths. For example, all LUNs of 130 may be accessible using ports of the three front end directors or interfaces 122a-122c, also denoted respectively FA1, FA2 and FA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the driver 106 may also perform other processing in addition to load balancing in connection with path selection. The driver 106 may be aware of, and may monitor, all paths between the host and the LUNs of the device 130 in order to determine which of the multiple paths are active or available at a point in time, which of the multiple paths are unavailable for communications, and to use such information to select a path for host-data storage system communications.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a director on the host 102, and the second endpoint may correspond to a port of a data storage system component, such as a port of an FA of the data storage system 120. In the example 100, elements A1, A2 and A3 each denote a port of a host 102 (e.g. such as a port of a host bus adapter or HBA), and elements B1, B2 and B3 each denote a port of an FA of the data storage system 120. Each of the LUNs of the device 130 may be accessible over a first path represented by A1-B1, a second path represented by A2-B2 and a third path represented by A3-B3.

Figure 4:
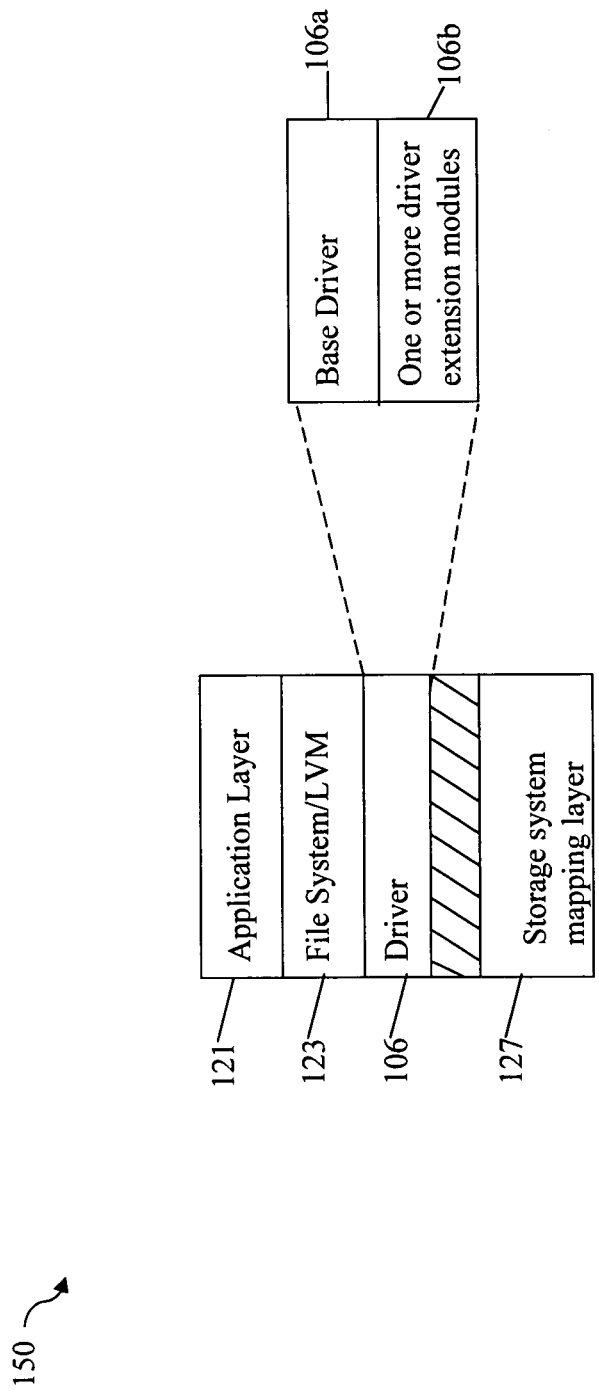
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the driver 106 of FIG. 3. The system includes an application layer 121 which includes application programs executing on the host computer 102. The application layer 121 may refer to storage locations using an associated label or identifier such as a file name. Below the application layer 121 is the file system/LVM layer 123 that maps the label or identifier specified by the application layer 121 to a LUN which the host may perceive as corresponding to a physical device address (e.g., the address of one of the disk drives) within the storage system 12. Below the file system/LVM layer 123 is the driver 106 which handles processing of the I/O received from layer 123. The driver 106 may include a base driver 106a and one or more driver extension modules 106b. The driver 106 may be included in a commercially available product such as EMC® PowerPath® software. Functionality for performing multipathing operations such as may be performed by EMC® PowerPath® software may be included in one of the extension modules 106b such as a multipath (MP) extension module. As described above, the MP extension module may perform processing in connection with selecting one of a plurality of possible paths for use in connection with processing I/O operations and communicating with the data storage system, such as 120 of FIG. 3. The layer 123 may provide for mapping a LUN as presented by the data storage system to the host to another logical data storage entity that may be used by the application layer 123.

In some embodiments, the data storage system 120 may be an intelligent data storage system having its own mapping layer 127 such that the LUN passed from the host may not directly correspond to a physical device such as a disk drive. In such embodiments, the LUN provided by the host in connection with the I/O operation may be further mapped by the data storage system using its mapping layer 127. For example, an LUN provided by the host may be mapped by the data storage system to one or more physical drives, multiple LUNs may be located on a same physical device, and the like. In other embodiments, the data storage system may not include such a mapping layer 127.

The driver 106, as well as other components illustrated in FIG. 4, may execute in kernel mode or other privileged execution mode. In one embodiment using a Unix-based operating system, the driver 106 may execute in kernel mode. In contrast, an application may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like.

In operation, an application executing at application layer 121 may issue one or more I/O operations (e.g., read and write operations) to devices. Such I/O operations may be directed to the driver 106 after passing through any intervening layers such as layer 123. To add new functionality or otherwise upgrade an existing driver, new driver extension modules may be required.

What will now be described are techniques that may be used in connection with performing a non-disruptive upgrade of a driver after an initial installation and reboot to install an embodiment of a new driver in accordance with techniques described herein. Subsequent to this initial installation of the new driver, non-disruptive upgrades to the new driver may be performed. The new driver may include a base driver and one or more extension modules as described above. The upgrades may be characterized as non-disruptive with respect to applications performing input/output (I/O) operations to one or more devices presented to the applications by the driver. The applications may continue to seamlessly perform I/O operations to the devices throughout the upgrades without having to reload or restart the applications. The upgrade may include, for example, replacing an existing driver extension module with an upgraded version, adding a new driver extension module with additional functionality, and/or removing an existing driver extension module. While the driver is handling I/O operations using an existing device configuration tree and existing device stack with a first set of extension modules corresponding to an existing or current version of the driver, the driver may configure a new device stack and new device configuration tree based on the existing device configuration tree along with any necessary modifications in accordance with the upgrade. The new device stack and new device configuration tree may use the one or more upgraded driver extension modules associated with the upgraded version of the driver. While the driver is handling I/O operations during the upgrade, processing may be performed to cut over on a device by device basis from the driver's existing device configuration tree and existing device stack using the current version of the driver to the new device stack and new device configuration tree using the upgraded version of the driver. As described in more detail below, cutting over on a per device basis as part of the driver upgrade process in an embodiment in accordance with techniques herein may include, for each device, suspending new I/Os directed to the device at the top of the device stack, draining I/Os of the device from the running driver's existing device stack, obtaining runtime configuration of the device and setting the current device's state in the new configuration tree and new device stack, and resuming subsequent I/Os directed to the device using the new configuration tree and new device stack.

Although the techniques herein may be used in an embodiment in which the driver to be upgraded resides on a host and manages data storage devices on a data storage system, the driver to be upgraded may also manage data storage devices that are directly attached to the host.

Figure 5:
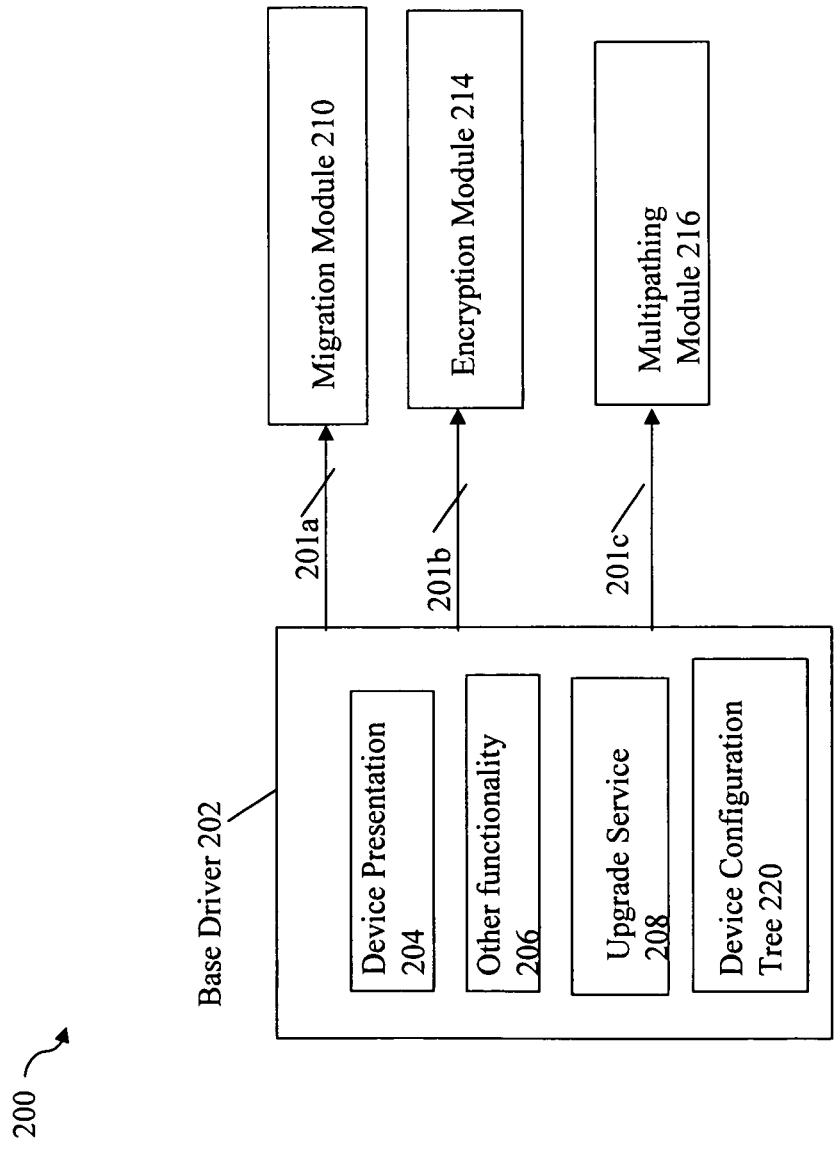
FIGS. 5-11, 13 and 16-19 are examples illustrating different components and structures that may be used in an embodiment in accordance with techniques herein.

Referring to FIG. 5, shown is an example of an embodiment of components that may be included in an embodiment in accordance with techniques herein. The example 200 illustrates a base driver 202, extension modules 210, 214 and 216, and device configuration tree 220. In this example, element 210 represents a module providing functionality for performing data migration, element 214 represents a module providing functionality for performing encryption, and element 216 represents a module providing functionality for performing multipathing. Module 216 may provide functionality as described above in connection with module 106b for multipathing operations. The base driver 202 may include functionality for device presentation 204, an upgrade service 208 and other functionality 206. The upgrade service 208 may provide for non-disruptive upgrades of the driver such as, for example, by upgrading and/or adding one or more driver extension modules. The device configuration tree 220 may refer to a structure organizing devices presented to an application where each node in the tree represents one of the devices. A device tree may be any suitable logical tree structure known in the art such as, for example, a binary tree, B-tree, and the like. It should be noted that rather than having a tree structure, the information of the device configuration tree may be more generally included in any suitable structure known in the art such as an array, list, and the like.

The base driver 202 and extension modules 210, 214 and 216 may represent functionality of a current version of the driver that may be installed on a system. In accordance with techniques herein, the upgrade service 208 may provide for subsequent non-disruptive upgrades to the current version of the running driver.

The device configuration tree 220, and other device configuration trees described in connection with techniques herein, may be included within the base driver 202 although the figures, such as FIG. 5 and others herein, may not specifically illustrate this.

An extension module, as included in the driver and which may be upgraded, may also more generally include other functionality than the particular functionality described herein. In other words, additional functionality may be extracted from the base driver 202 and included in an upgradeable extension module. For example, an embodiment may also include as an upgradeable extension module a module that performs internal filtering within the driver, a module that provides common services used by the migration module, encryption module, multipathing module, and the like. To further illustrate, an upgradeable extension module may be a common service module providing operating system platform independent primitives such as associated with locks, memory allocation/deallocation, timers, and the like. One or more of the other extension modules may use the services provided by the common service module. Additional examples illustrating the foregoing general applicability of the techniques herein to any extracted and upgradeable driver functionality are set forth herein.

FIG. 5 illustrates the state of the driver after an initial installation of the driver and then a reboot. The base driver 202 may be executing and provide for direct and/or indirect transfer of control to the modules 210, 214 and/or 216 in connection with processing I/O operations for presented devices as indicated by arrows 201a, 201b and 201c. Nodes of the device configuration tree 220 representing presented devices may identify top level device stack entries corresponding to modules 210, 214 and/or 216. The foregoing is described in more detail in following paragraphs. Each of 210, 214 and 216 may be loadable kernel modules. In connection with techniques herein and as will be more fully described elsewhere herein, the base driver 202 may execute in kernel mode and, once installed and executing, may remain as active and executing so long as the system is running. In an embodiment in accordance with techniques herein, the upgrade may be performed in a non disruptive manner with respect to upgrades to the driver extension modules. Once installed and running, the base driver 202 may not be upgraded as part of the non-disruptive upgrade processing described herein. In accordance with such an embodiment, the base driver 202 may be characterized as "thin" with respect to having functionality that may be the subject of an upgrade extracted therefrom and included in one or more of the driver extension modules.

Prior to describing processing in connection with performing an upgrade to the driver illustrated in FIG. 5, a device stack and device configuration tree as may be currently in use by the driver will be described.

Figure 6:
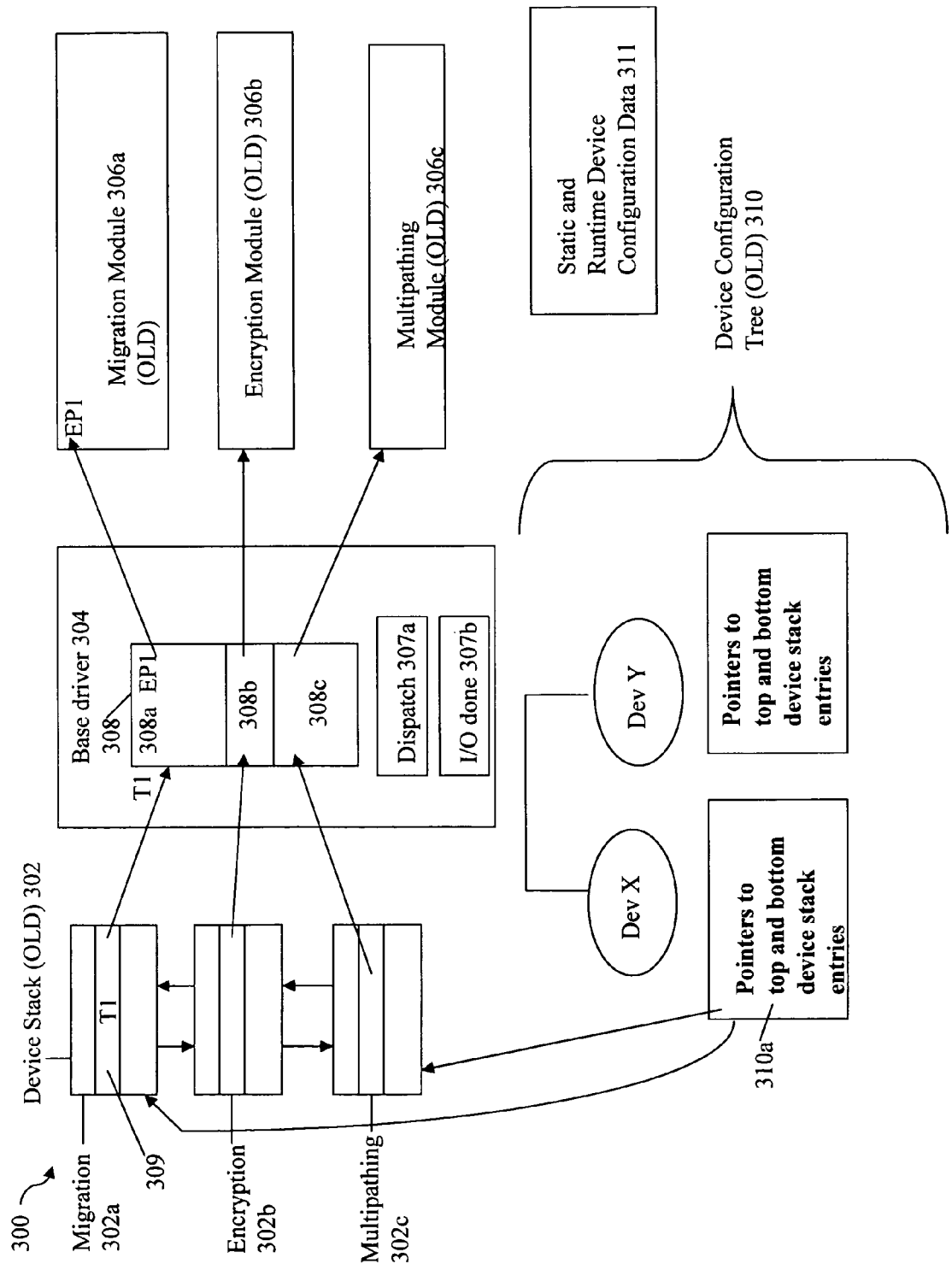

Referring to FIG. 6, shown is an example illustrating a device stack and device configuration tree as may be used in an embodiment in accordance with techniques herein. The example 300 includes a device stack 302, base driver 304, extension modules 306a-306c, and device configuration tree 310. Elements 302, 306a-306c and 310 are denoted as "OLD" since these correspond to elements currently in use prior to a subsequent driver upgrade described below. The device stack 302 may be a list of structures or entries. In one embodiment, the device stack may be implemented as a doubly linked list of structures where each structure corresponds to a level in the device stack used in processing an I/O operation. In this example, the device stack 302 may include 3 levels, one level corresponding to each extension module. For example, stack level 1 corresponds to stack entry 302a for the migration module 306a, stack level 2 corresponds to stack entry 302b for the encryption module and stack level 3 corresponds to stack entry 302c for the multipathing module 306c. Each entry of the device stack 302 may include a field which points to, or more generally identifies, a corresponding extension descriptor of the base driver 304. An extension descriptor may include a list of entry points or, more generally, addresses. Element 308 represents all such extension descriptors. There is one extension descriptor in 308 for each level in the device stack. For example, element 308 includes 3 extension descriptors denoted 308a-308c. To further illustrate, device stack entry 302a may include field 309 with a pointer to location T1 in the base driver 304a. The location T1 may be the address of the extension descriptor 308a for the migration module 306a. Each of 308a-308c corresponding to one of the device stack levels and associated extension module may include one or more registered entry points within the associated extension module. For example, descriptor 308a is associated with stack level 1 and migration module 306a and may identify the entry points EP1 within the module 306a. At runtime, control may be transferred to one of the extension modules through the linkages provided using the device stack and extension descriptors. For example, processing may be performed to access stack entry 302a and obtain the address T1 identifying descriptor 308a, the descriptor for the migration module 306a. Subsequently, the address of a desired entry point within module 306a may be obtained by accessing an appropriate location within the descriptor 308a. Control may then be transferred to the desired entry point, such as EP1, of the migration module 306a. The foregoing may be accomplished using one or more routines within the base driver and/or extension module(s). At runtime, the foregoing processing may be performed with respect to each device stack level so that the device stack is traversed and processed in a top to bottom manner. For example with reference to FIG. 6 when dispatching an I/O operation using the illustrated device stack 302, the stack may be traversed in the order of entries 302a, 302b and 302c. As used herein, dispatching may refer to processing an I/O operation using the device stack in the order illustrated in a top to bottom order as illustrated. The routine dispatch 307a may be used to access the appropriate entry point in one of the extension descriptors when traversing the device stack in the foregoing top to bottom order.

It should be noted that the extension descriptors may also include other information in addition to the registered entry points as described herein. Also, in connection with other I/O processing, a device stack may be traversed in a bottom to top manner, for example, in connection with asynchronous I/O completion when requested data of a read operation is returned to the host from the data storage system. The routine I/O done 307b may be used to access the appropriate entry point in one of the extension descriptors when traversing the device stack in the foregoing bottom to top order.

The device configuration tree 310 may include a node for each device presented to an application. In this example, devices X and Y may be presented for performing I/O operations. Each node in the tree 310 may include a variety of information regarding the device of the node. Information for each node in the tree may include static and/or runtime device configuration data, a pointer to the top device stack entry, a pointer to the bottom device stack entry, and possibly other information not explicitly illustrated in FIG. 6 and others herein for each node. It should be noted that the pointers to the top and bottom stack entries are only illustrated with respect to 310a but other nodes of the device tree may include similar connections. For example, element 310a includes a pointer to the top device stack entry for the presented device X. Element 310a may point to, or more generally, identify, an entry in the device stack 302 which is the top level of the device stack for the presented device X. At runtime, control may be transferred to the extension modules in accordance with an ordering as provided by the levels of the device stack 302 using linkages as described above. Each device presented to an application for use in connection with I/O operations may be identified using a device identifier such as may be assigned by the operating system. The operating system's device identifier may be used to identify a corresponding node in the device tree by matching a device identifier included in an I/O operation with the device identifier associated with a tree node.

Element 311 generally represents static and runtime device configuration data as may be used in connection with the devices of the device tree 310. As mentioned above, a portion of the configuration data may be stored in nodes of the device configuration tree as well as other locations such as, for example, in the device stack and other structures used in connection with techniques herein.

Static device configuration data may include a variety of different types of data. For example, static configuration data may include mappings between SCSI-based initiator-target-LUN path specifications (e.g., what LUNs are visible to the host on what path(s)) and corresponding storage world wide names (WWNs), device node to storage volume WWN mappings, load balancing policy for a storage LUN, LUN encryption setting, and the like.

Runtime device configuration data may include transient states and internal counters of the device. For example, runtime configuration data may include information about whether a device is open, being accessed in a particular way such as for exclusive access, and the like. Some runtime device configuration data may not be stored persistently and may be determined by querying or testing the device as part of cutover processing described herein.

Different portions of the static and/or runtime device configuration data may be stored in connection with the device configuration tree nodes, device stack, and the like.

At a point in time subsequent to the installation of the driver described in connection with FIG. 5, the upgrade service of the driver may receive one or more user mode commands to request and perform a driver upgrade.

Figure 7:
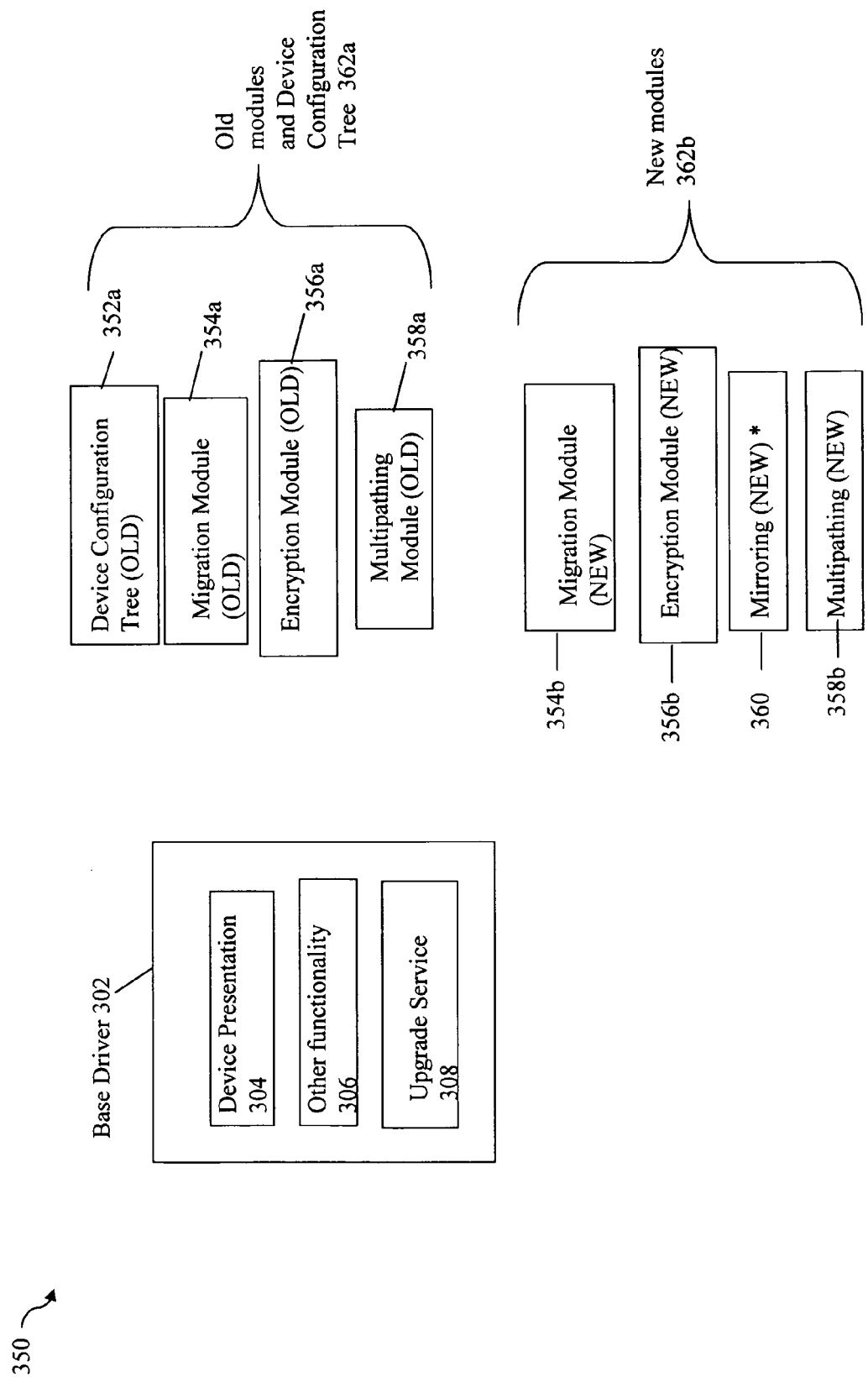

Referring to FIG. 7, shown is an example illustrating modules of a driver upgrade in an embodiment in accordance with techniques herein. The example 350 may include the base driver 302 with old modules and a device configuration tree 362*a* as described above. The base driver 302 and modules 352*a*, 354*a*, 356*a* and 358*a* may represent a current version of the driver referred to herein as OLD to denote the driver version prior to upgrade. The upgrade service 308 may receive the user mode commands as described above to request and perform an upgrade. In this example, the upgrade may include upgrading the driver to use new driver extension modules 362*b*. The new driver extension modules 362*b* may include upgraded versions of the migration module 354*b*, encryption module 356*b* and multipathing module 358*b*. Additionally, the upgrade may provide new mirroring functionality in the mirroring module 360. The new modules 362*b* are loaded into the kernel using functionality as may be provided by the operating system. It should be noted that modules, device configuration tree and device stack associated with the upgraded version of the driver are denoted using NEW in FIG. 7 and others herein.

Figure 8:
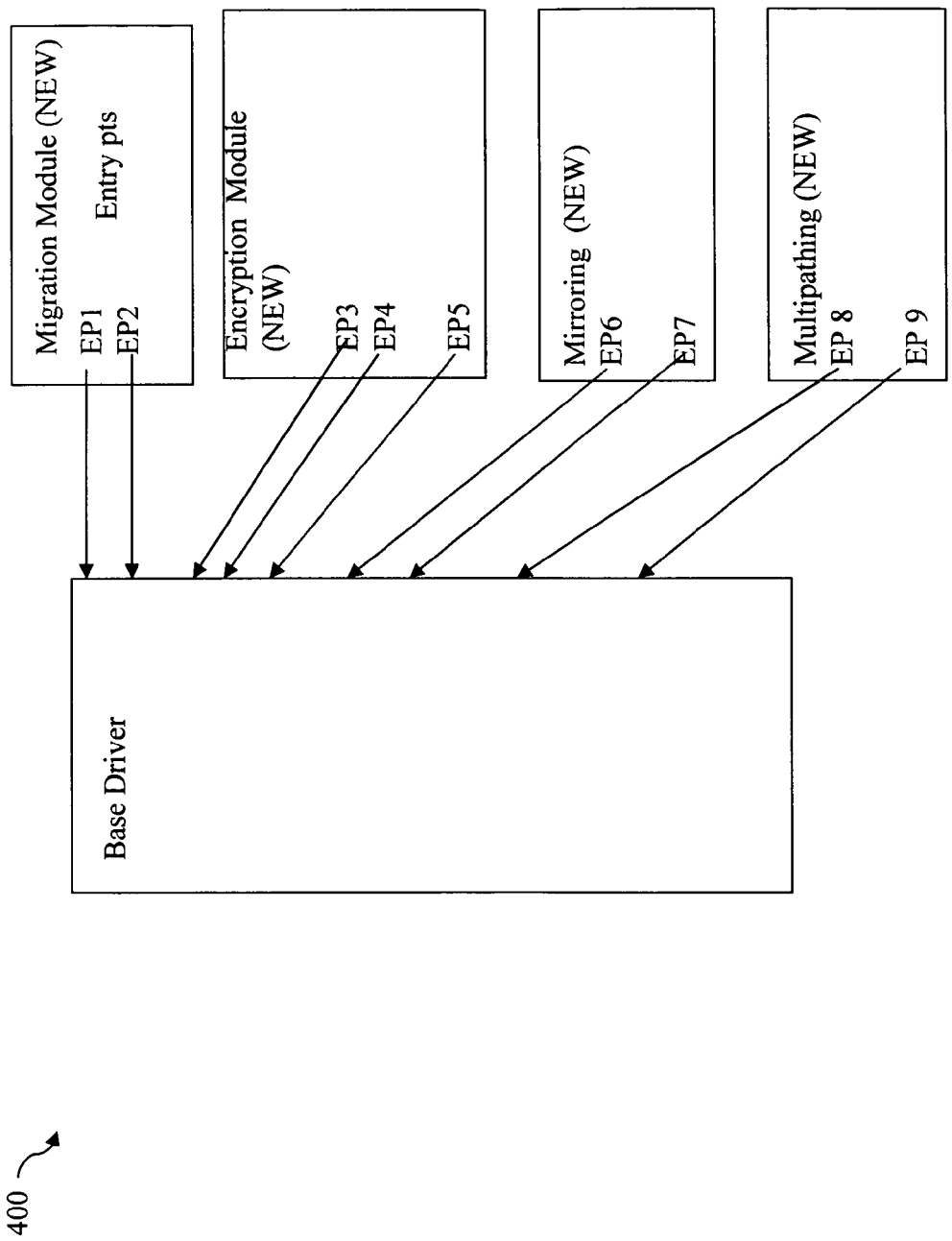

Subsequently, each loaded module of the upgrade (e.g. each module of 362*b*) may have its entry points registered with the base driver as illustrated in FIG. 8. The foregoing registration may result in the addresses of the entry points being stored for use by the base driver when processing I/Os as will be described and illustrated in connection with FIG. 9.

Additionally, as described and illustrated in more detail below, upgrade processing also includes configuring a new device configuration tree and new device stack for use with the upgraded version of the driver.

Figure 9:
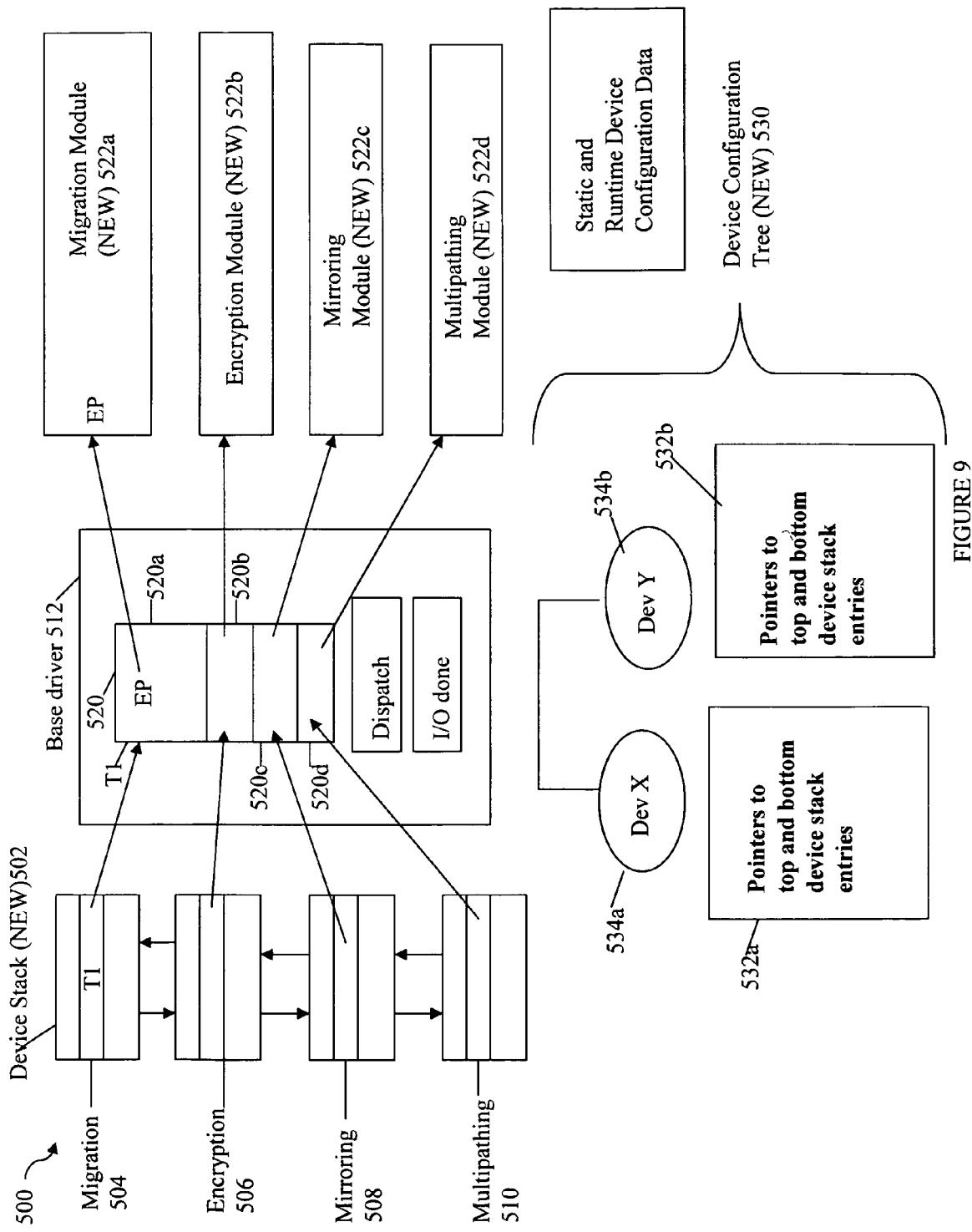

With reference to FIG. 9, shown is an example of a device stack, driver and device configuration tree associated with an upgraded version of the driver in an embodiment in accordance with techniques herein. In a manner similar to that as described in connection with FIG. 6, the example 500 includes a device stack 502, base driver 512, device configuration tree 530 and upgrade modules 522*a*-522*d*. The device stack 502 and device configuration tree 530 may be created and configured in connection with upgrade processing for use with the new or upgraded version of the driver (e.g., denoted NEW). The base driver 512 includes extension descriptors 520. In this example, the device stack 502 includes 4 levels and 4 entries corresponding respectively to the 4 modules. Device stack entry 1, 504, corresponds to the migration module and first device stack level. Device stack entry 2, 506, corresponds to the encryption module and second device stack level. Device stack entry 3, 508, corresponds to the mirroring module and third device stack level. Device stack entry 4, 510, corresponds to the multipathing module and fourth device stack level.

Upgrade processing may include, for example, allocating storage for the device stack 502 and device configuration tree 530 and populating the foregoing as well as structures used by the base driver 512 with appropriate information for the upgraded driver.

As a result of registration, the extension descriptors 520 may be populated with addresses of the registered entry points of the modules 522*a*-522*d*. The extension descriptors 520 include 4 descriptors 520*a*-520*d*, one for each stack level and associated module. Element 520*a* includes the entry points for migration module 522*a* as registered and illustrated in connection with FIG. 8. Similarly, elements 520*b*, 520*c* and 520*d*, respectively, include entry points for the encryption module 522*b*, mirroring module 522*c* and multipathing module 522*d* as registered and illustrated in connection with FIG. 8.

It should be noted that the upgrade processing is performed while the current or OLD version of the driver is running and using the OLD device configuration tree and OLD device stack as described in connection with FIG. 6.

In connection with performing upgrade processing, static and runtime device configuration information are transferred from the old version of the driver to the new version of the driver as described below.

Figure 10:
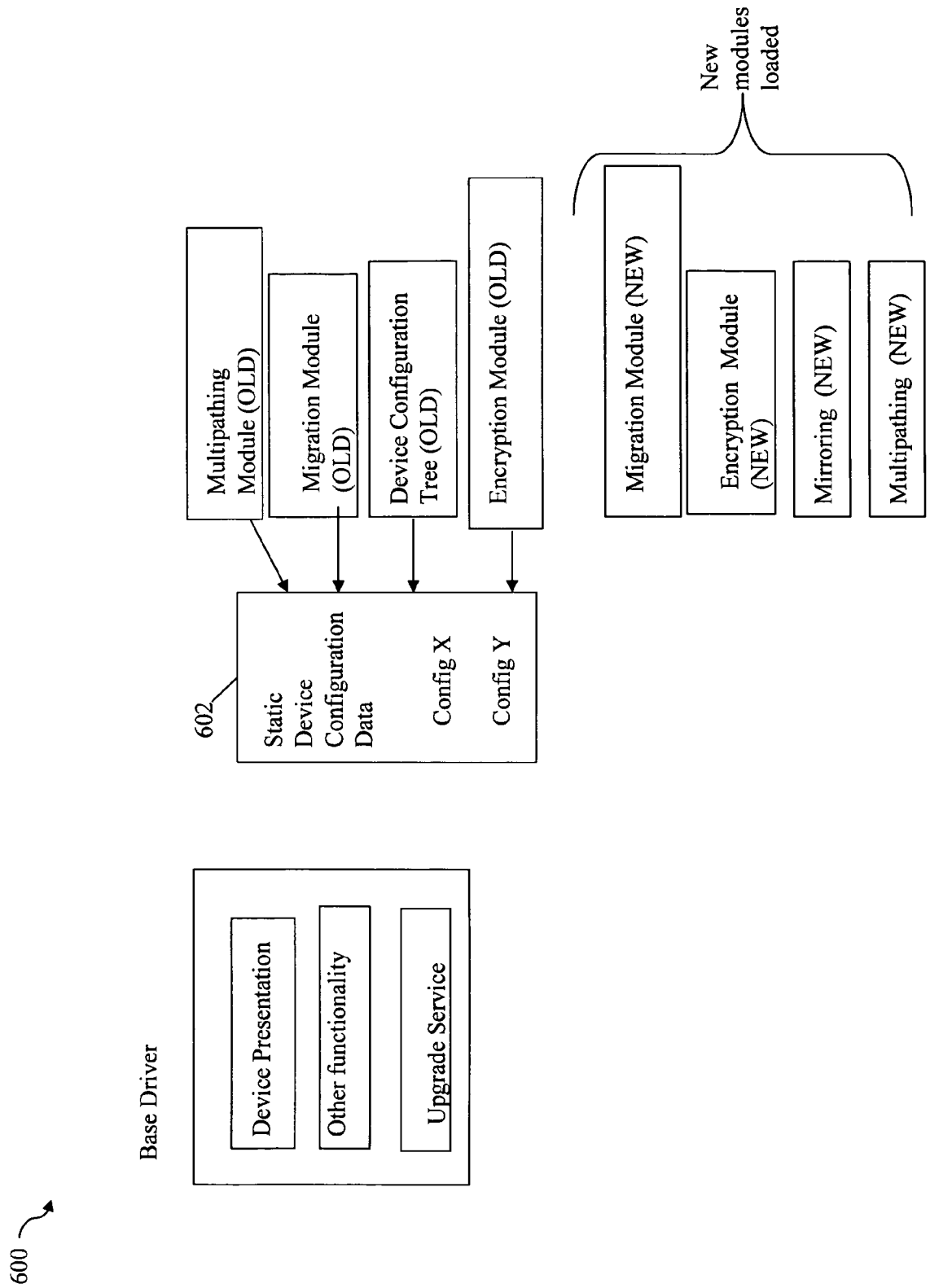

As illustrated in FIG. 10, static device configuration data is retrieved from the old version of the driver and stored as represented by element 602. With reference to FIG. 10, an exemplary procedure is illustrated to freeze or disallow any modification to static device configuration data, retrieve the static device configuration data of the old version of the driver and then store the static device configuration data 602. Element 602 may represent the static device configuration stored in any suitable form such as in a persistent file image.

Figure 11:
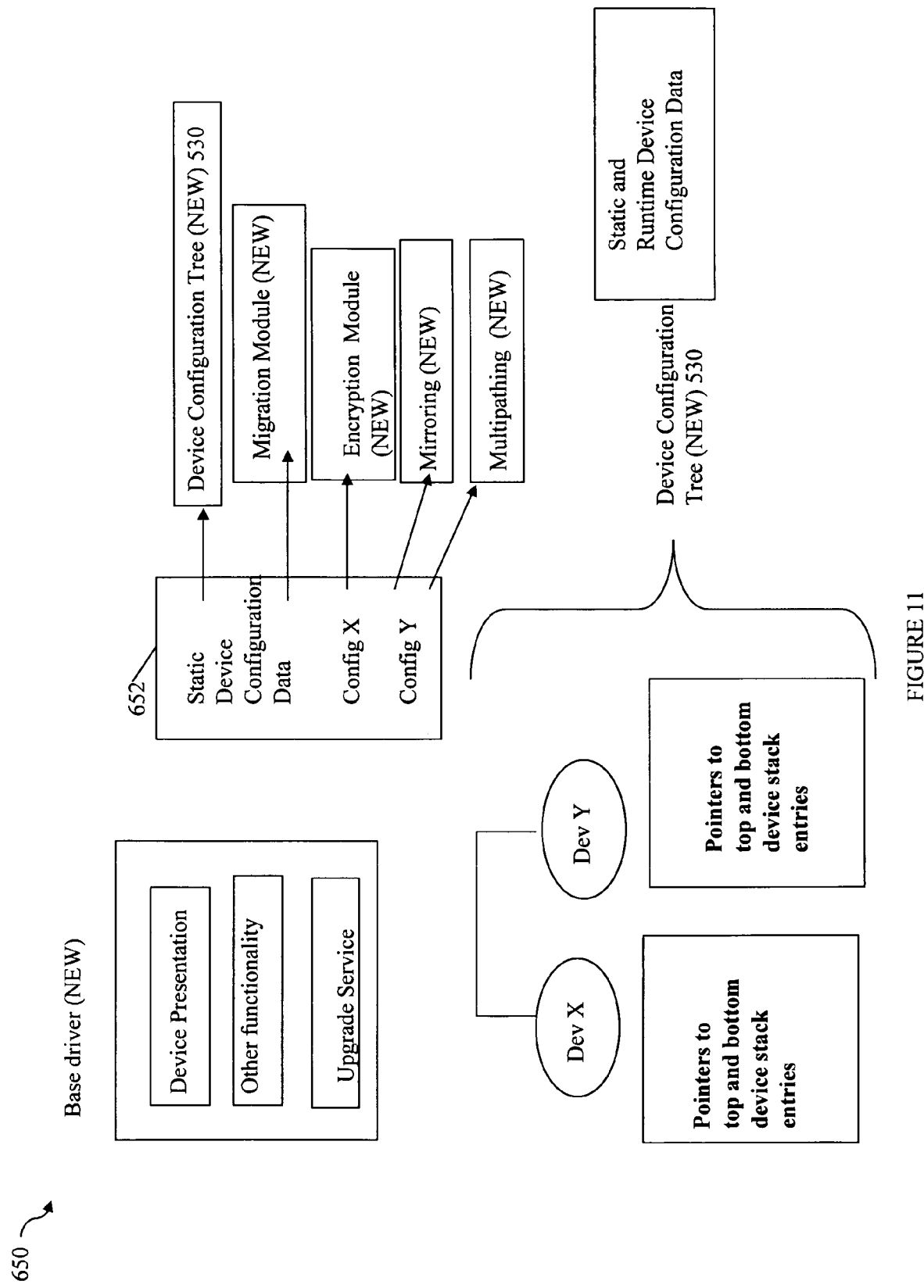

As illustrated in FIG. 11, the upgrade process may then retrieve the stored static device configuration data and use it in connection with configuring the new device configuration tree and/or new device stack, or more generally, the new driver. In one embodiment, the static device configuration data 602 may be processed to identify each device therein and add a node in the new configuration tree for each such device. Setting up the new device configuration tree may also include, for example, setting modes of the volumes and device, incorporating default configuration information, modifying or updating any old configuration data in accordance with the upgrade, and storing pointers to the top and bottom level device stack entries for each device.

It should be noted that processing illustrated in FIGS. 10 and 11, as well as others herein in connection with upgrade processing, may be performed in response to user mode commands received by the upgrade service. As described elsewhere herein, an upgrade script may be executed resulting in such commands issued to the upgrade service.

Runtime device configuration transfer may be performed during the cutover process one device at a time in order to minimize application delay. Before cutover for a device is performed, all I/Os of the device are sent through a device stack of the existing or current driver. After cutover, all I/Os of the device are sent through the device stack of the new or upgraded driver. Cutover processing may be performed one device at a time and may include temporarily pausing or suspending any new I/Os for the device. Any I/Os in flight or in progress within the old device stack are drained thus, in combination with the suspension of new I/Os, freezes the state of the device. The current runtime state of the device of the old driver is then determined, for example, such as by issuing commands or tasks to the device. Subsequently, the runtime state of the device of the new or upgraded driver is configured. Setting or configuring the device of the new or upgraded driver may include, for example, setting values for runtime configuration data stored in the tree, device stack and/or other locations. After the runtime configuration state and data for the device is transferred and possibly modified for use with the driver upgrade, processing of I/Os directed to the device is resumed using the new device stack and new device configuration tree. It should be noted that modifications to static and/or runtime configuration may be performed or controlled by commands executing in user mode such as may be included in an upgrade script as described elsewhere herein.

Figure 12:
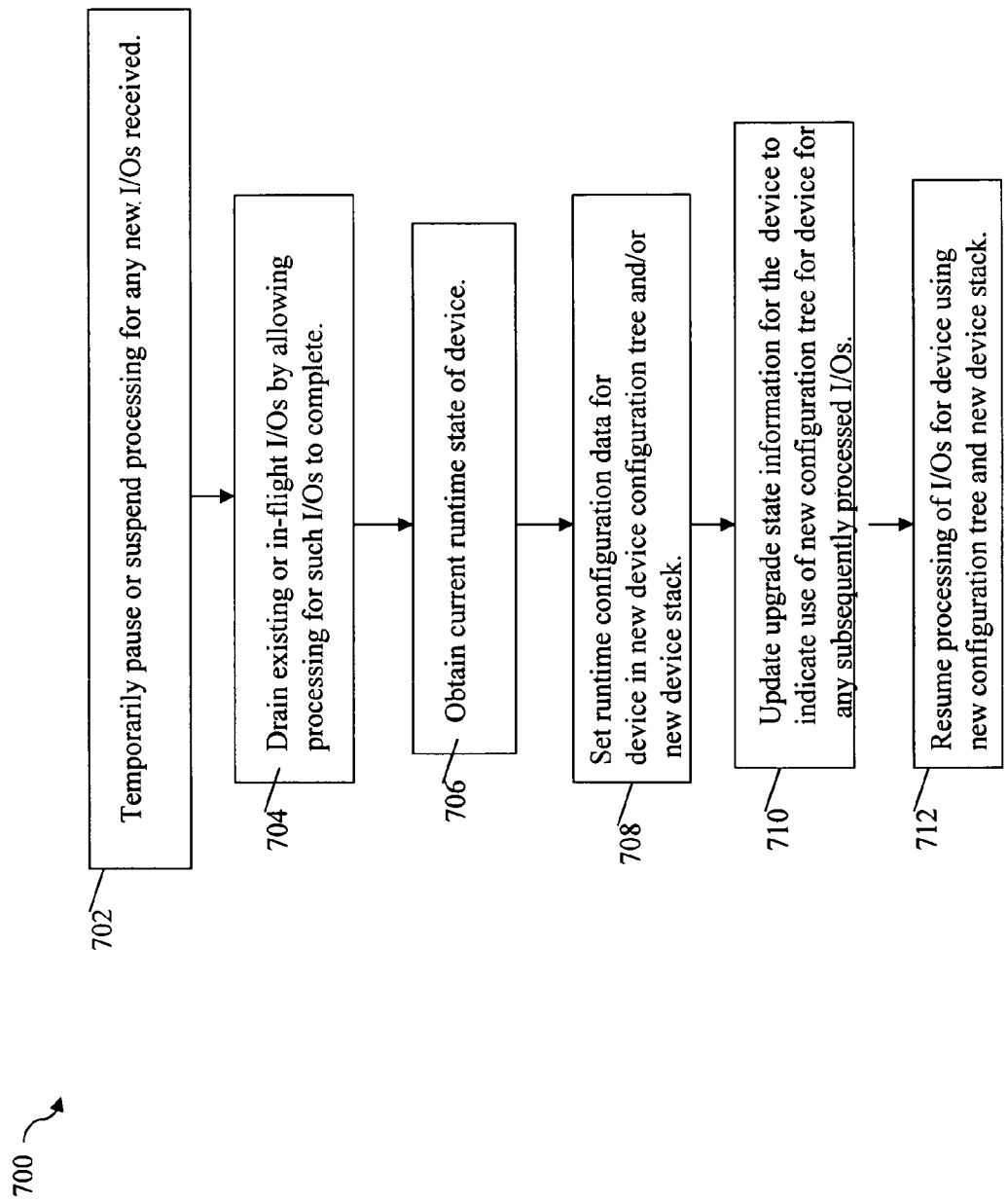
FIGS. 12, 14 and 15 are flowcharts of processing steps that may be performed in an embodiment in accordance with techniques herein.

Referring to FIG. 12, shown is a flowchart of processing steps that may be performed in an embodiment in connection with techniques herein for cutover processing of a device. The flowchart 700 summarizes processing described above that may be performed for each device to transfer runtime device state information for use with the new driver and its new device configuration tree and new device stack. At step 702, processing for any new I/Os received for the device is temporarily paused or suspended. At step 704, existing or inflight I/Os using the old device stack are drained by allowing processing for such I/Os to complete. At step 706, the runtime configuration state of the device is obtained. At step 708, runtime configuration data for the device is set. Step 708 may include setting information in the new device configuration tree, device stack, and the like, for the device. At step 710, upgrade state information is updated indicating that the new device tree is used rather than the old device tree for any subsequently processed I/Os. For example, in one embodiment, the node of the old device configuration tree corresponding to the device may be updated to indicate that the new configuration tree is to be used. Such an indication may be made, for example, by setting a flag within the node of the old configuration tree. At step 712, processing of I/Os for the device is resumed using the new configuration tree and new device stack. The flowchart 700 may be performed for each device in the new device configuration tree.

Figure 13:
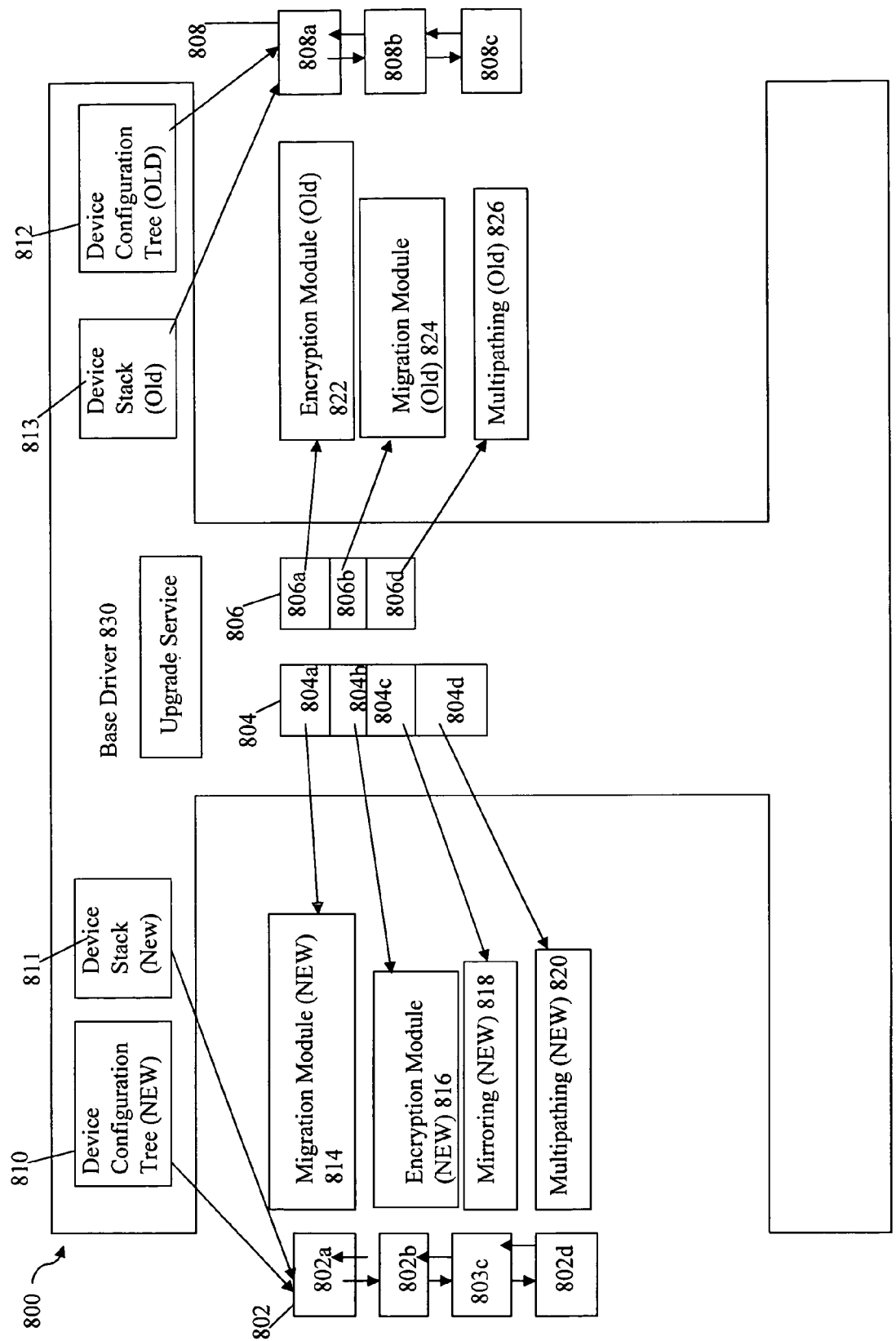

Referring to FIG. 13, shown is an example of components that may be executed in an embodiment in accordance with techniques herein in connection with upgrading an existing or old driver. The example 800 illustrates use and operation of components during the upgrade process as described above. The base driver 830 and modules 822, 824 and 826 comprise the old or existing version of the driver prior to upgrade. The old version of the driver uses the device stack 808 and device configuration tree 812. Element 806 may represent the extension descriptors including the registered entry points in the modules 822, 824 and 826. The base driver 830 and modules 814, 816, 818, and 820 comprise the new or upgraded version of the driver. The new or upgraded version of the driver uses the device stack 802 and device configuration tree 810. Element 804 may represent the extension descriptors including the registered entry points in the modules 814, 816, 818, and 820. When the system is not performing an upgrade, the elements of the driver on the right side of the example 800 associated with the old or existing driver version may be used (e.g., elements 813 (identifying the first entry in the old device stack 808), 812, 822, 824, 826 and 806). When the system is performing a driver upgrade with respect to the extension modules, both the elements of the driver on the right side of the example 800 (e.g., those associated with the old or existing driver version) and elements of the driver on the left side of the example 800 (e.g., elements 804, 814, 816, 818, 820, 802, 810, and 811 (identifying the first entry in the new device stack 802) associated with the new or upgraded driver version) may be used. When the driver upgrade is complete, those elements of the old driver version which are not associated with the new upgraded driver version may no longer be in use during operation of the driver when processing I/O operations. For example with reference to FIG. 13, elements 812, 813, 822, 824, 826 and 806 associated with the old or existing driver version are no longer in use by the driver after upgrade to the new driver version is complete. It should be noted that each of the device stacks 808 and 802 contain an entry for each level in the device stack. For example with reference to 802, elements 802a-802d may each respectively contain an address of one of the descriptors 804a-d. Each of the descriptors 804a-d may be used to transfer control to a corresponding one of the modules 814, 816, 818 and 820 as described elsewhere herein in more detail.

In connection with performing a driver upgrade, once the runtime cutover processing is complete for all devices, the driver upgrade may be determined as complete and cleanup processing may be performed. The cleanup processing may include reclaiming any resources used with old driver which are no longer needed in connection with the new driver. For example, cleanup processing may include deallocating or freeing memory of the old device stack and old device tree, and unloading old driver extension modules 822, 824 and 826. It should be noted that whether the old driver extension modules may be dynamically unloaded while the system is running may vary with support and functionality in a particular operating system.

Figure 14:
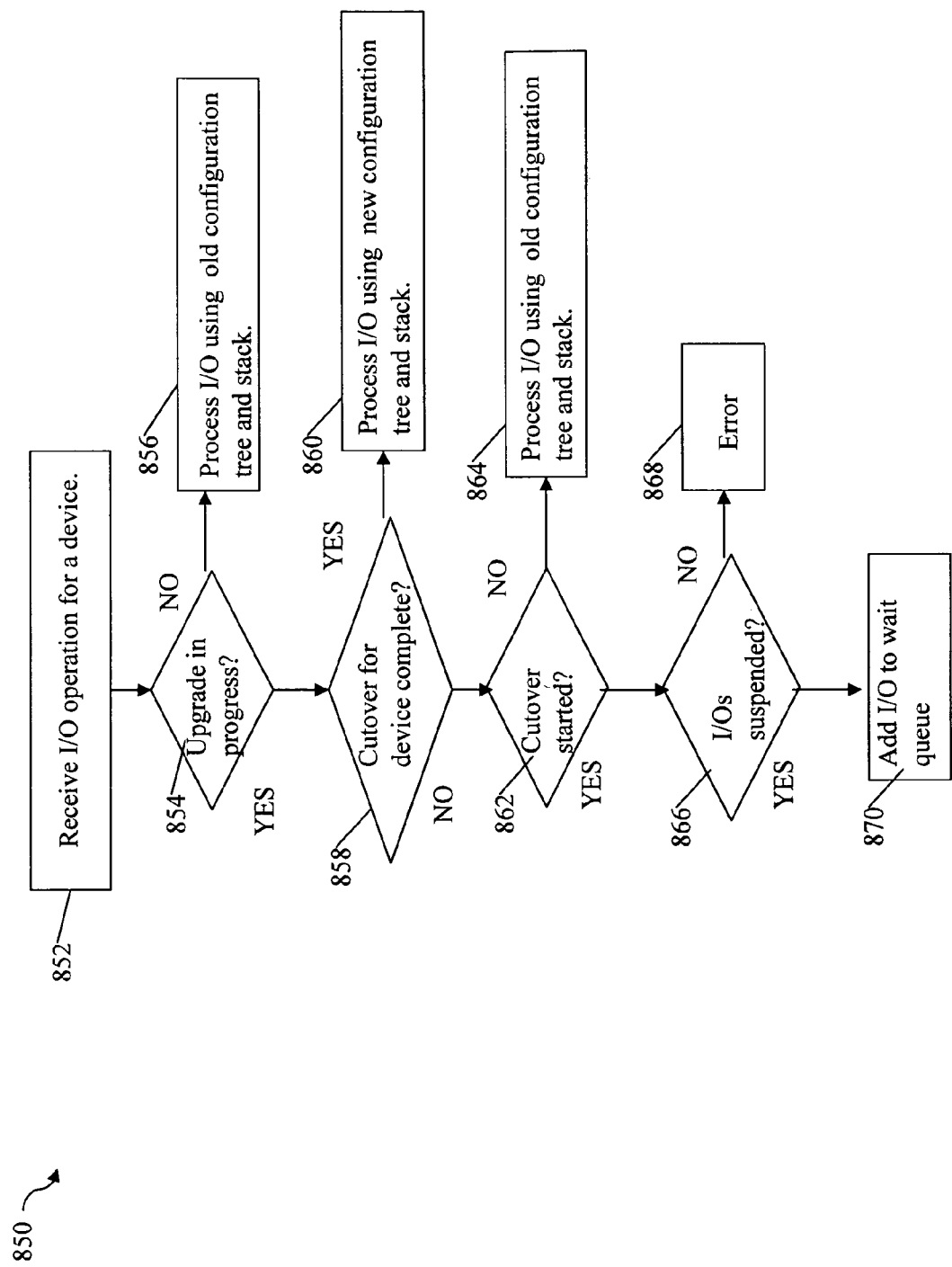

Referring to FIG. 14, shown is a flowchart of processing steps that may be performed in an embodiment in accordance with techniques herein when processing a received I/O operation. At step 852, the I/O operation is received and is directed to a device. At step 854, a determination is made as to whether there is an upgrade in progress. If not, control proceeds to step 856 to processing the I/O operation using the old configuration tree and stack corresponding to the existing or current driver version. If step 854 evaluates to yes, control proceeds to step 858 where a determination is made as to whether cutover processing for the device is complete. If so, control proceeds to step 860 where the I/O is processed using the new configuration tree and stack corresponding to the upgraded version of the driver. If step 858 evaluates to no, control proceeds to step 862 where a determination is made as to whether cutover processing has started for the current device. If step 862 evaluates to no, control proceeds to step 864 to process the I/O using the old configuration tree and stack corresponding to the old version of the driver prior to upgrade. Otherwise, if step 862 evaluates to yes, control proceeds to step 866 where a determination is made as to whether I/Os are suspended for the device. If step 866 evaluates to no, control proceeds to step 868 where an error condition or state may be determined. In one embodiment, the I/Os may be suspended when cutover processing is first commenced so that occurrence of state information indicating that cutover processing for the device has started but I/Os are not suspended indicates an error condition. If step 866 evaluates to yes, control proceeds to step 870 where the received I/O may be added to a wait queue of suspended or paused I/Os for the device.

It should be noted that upgrade state information may be maintained and updated accordingly in an embodiment to reflect the current upgrade state with respect to the driver in accordance with techniques herein resulting in processing such as illustrated in FIG. 14. In one embodiment, each node in the old configuration tree corresponding to an existing or current driver version may, for example, use one or more flags or indicators to indicate whether or not an upgrade is in progress, whether cutover processing for the device associated with the node is complete thereby causing the new or upgraded driver, new configuration tree and new device stack to be used, whether I/Os for the device are suspended if an upgrade is in progress, and the like. In one embodiment, a first flag may be globally defined with respect to the driver and may indicate whether or not an upgrade is in progress. Within each node of the device tree, a second flag may be indicate, when an upgrade is in progress, whether device cutover processing is complete for the particular device associated with the node.

Figure 15:
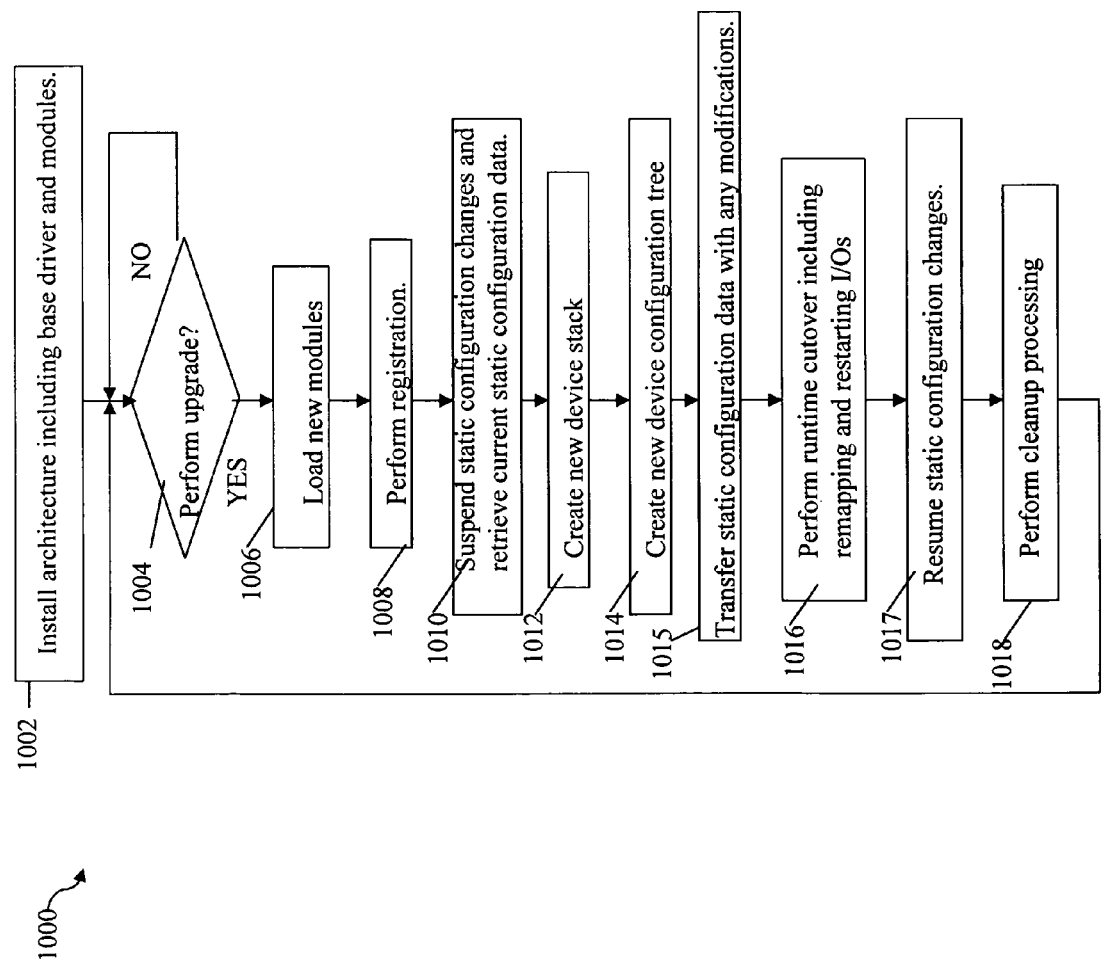

Referring to FIG. 15, shown is a flowchart of processing steps that may be performed in an embodiment in accordance with techniques herein. The flowchart 1000 summarizes processing described above. At step 1002, the new architecture including the base driver and extension modules may be installed. As described above, the installation in step 1002 may be disruptive with respect to applications directing I/Os to the devices serviced by the driver due to rebooting of the system. Subsequently, any upgrades to the driver other than to the base driver may be performed without disruption to the application performing I/Os. At step 1004, a determination is made as to whether to perform an upgrade. If not, control returns to step 1004. If step 1004 evaluates to yes, control proceeds to step 1006 to load the new modules and perform registration of the new module entry points in step 1008. In step 1010, static configuration changes are suspended and static configuration data may be retrieved and stored for the current version of the driver. The static configuration data may be stored as part of step 1010 in an image file. In step 1012, a new device stack is created and in step 1014 a new device configuration tree is created. In step 1015, the previously stored static configuration data may be retrieved and transferred for use with the new driver. Step 1015 may include retrieving the stored static configuration data and using this data in connection with populating the new device stack and/or new configuration tree. Step 1015 may also include making modifications to the configuration data in connection with the upgrade. At step 1016, runtime cutover processing is performed for the devices. As described herein, runtime cutover processing may be performed per device and includes suspending and draining I/Os to the device which use the old configuration tree and old device stack, obtaining runtime configuration state information for the device, setting the runtime configuration data for the device in connection with the new driver (e.g., updating runtime configuration data of the new device tree, new device stack, and the like). Once runtime cutover processing is completed for all devices, processing continues with step 1017 to resume static configuration changes. At step 1018, once runtime cutover processing is completed for all devices, cleanup processing may be performed with respect to resources used by the old version of the driver which are no longer in use with the new upgraded device driver. From step 1018, control may proceed to step 1004 where processing waits for a next upgrade such as may be triggered using a command issued from executing a script in user mode.

After an installation of a driver including a base driver and one or more extension modules where the base driver includes an upgrade facility, the techniques herein provide for a non-disruptive driver upgrade where such upgrades may include changes with respect to the one or more driver extension modules. Such changes may include, for example, a modification to an existing or current extension module such that a new version of an existing extension module is upgraded, removing a module or portion of functionality thereof, and/or adding a new extension module not currently included in a current version of a driver to provide additional functionality.

In another embodiment in accordance with techniques herein, the code that performs internal filtering for the driver may be extracted from the base driver and included as an upgradeable extension module referred to herein as an internal filtering (IF) module. The IF module may perform filtering or directing of I/O operation processing within the driver. For example, the IF module may be used in connection with directing I/O operation processing between different functional extension modules at different device stack levels such as with respect to the migration module occurring at a first device stack level, the mirroring module occurring at a second device stack level, and the like. Additionally, an embodiment may include other functionality such as common service module functionality as an upgradeable extension module. As described above, a common service module may provide operating system platform independent primitives such as associated with locks, memory allocation/deallocation, timers, and the like. One or more of the other extension modules may use the services provided by the common service module. The IF module (IFM) and common service module may both be loadable kernel modules that may be upgraded like any of the other extension modules as described above.

Figure 16:
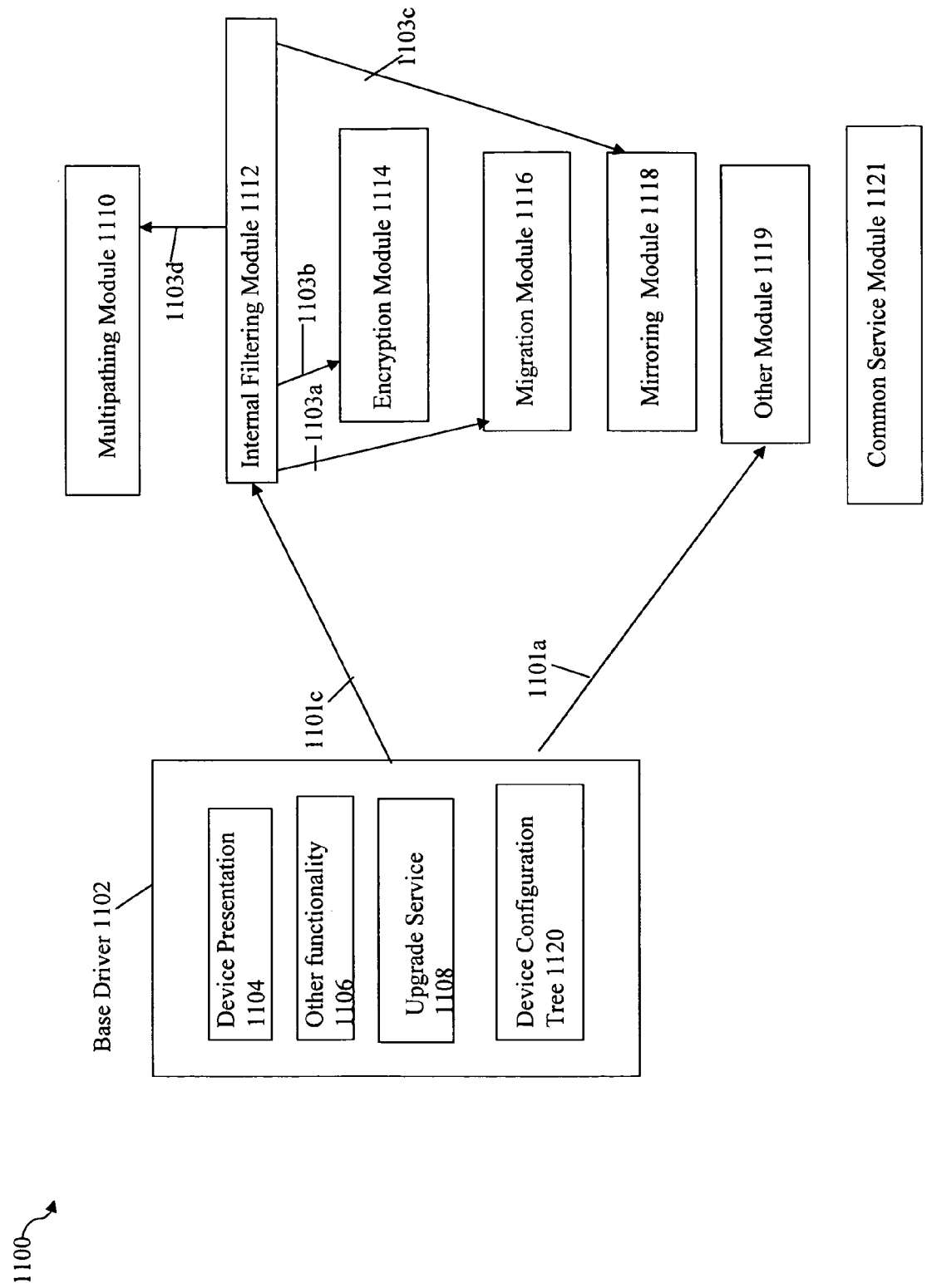

Referring to FIG. 16, shown is an example of an embodiment of components that may be included in a driver upgrade in an embodiment in accordance with techniques herein where the driver extension modules include an IFM. The example 1100 includes components similar to those as described and illustrated with the driver upgrade above with the addition of IFM 1112 other module 1119, and common service module 1121. The other module 1119 may provide additional new functionality for the driver. Furthermore, the base driver 1102 in combination with the IFM 1112 provide for indirect transfer of control to the modules 1110, 1114, 1116, and 1118 in connection with processing I/O operations for presented devices. The base driver 1102 transfers control directly to the other module 1119. In this case, the IFM 1112 may provide for an additional level of indirection in the linkage when transferring control to code of the extension modules when traversing the device stack and processing I/O operations. Arrow 1101a illustrates the linkage or transfer of runtime control as may be provided between the base driver 1102 and the other module 1119. Arrow 1101c illustrates the linkage or transfer of runtime control as may be provided between the base driver 1102 and the IFM 1112. Arrows 1103a-d illustrate, respectively, the linkage or transfer of runtime control as may be provided between the IFM 1112 and modules 1116, 1114, 1118 and 1110.

The device configuration tree 1120 includes nodes for presented devices and may identify top and bottom level device stack entries corresponding to any of modules 1110, 1112, 1114, 1116, 1119 and/or 1118 as described elsewhere herein. Each of the extension modules 1110, 1112, 1114, 1116, 1121, 1119, and 1118 may be loadable kernel modules.

During runtime, any one of the modules 1110, 1112, 1114, 1116, 1119 and 1118 may call routines included in the common services module 1121. The module 1121 may not correspond to a layer in the device stacks and thus does not have a corresponding entry on any device stack.

In such an embodiment of the driver of FIG. 16, module registration may be performed to register extension module entry points of the extension modules 1110, 1112, 1114, 1116, 1121, 1119, and 1118. In this example, it should be noted that modules 1119 and also 1121 may have control directly transferred from the base driver in contrast to the other extension modules having control indirectly transferred through the IFM, where control may be transferred to the IFM directly from the base driver.

Figure 17:
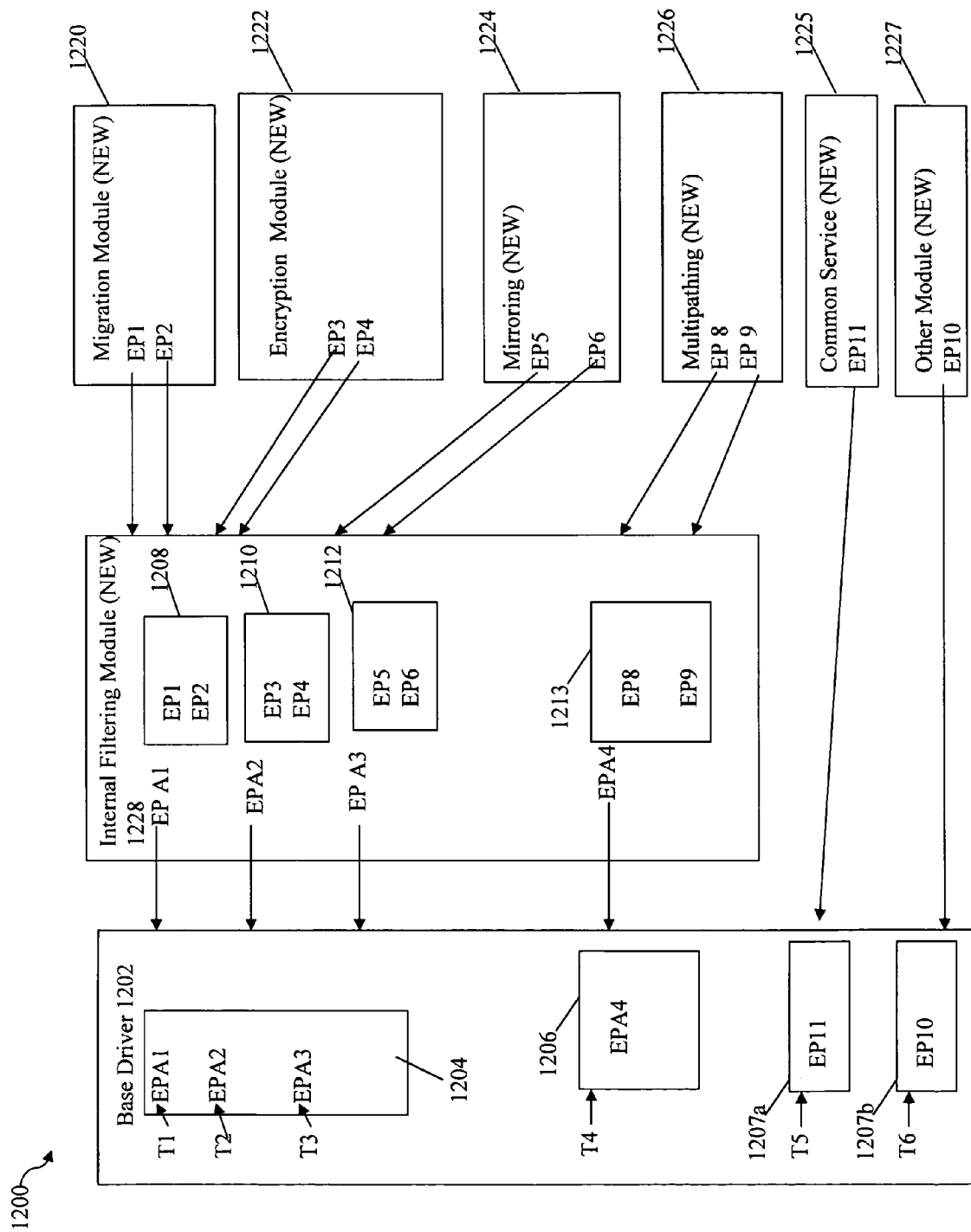

Referring to FIG. 17, shown is an example illustrating registration of module entry points as may be performed in an embodiment in accordance with techniques herein using the IFM. In a manner similar to that as described above such as in connection FIG. 8, module entry point registration is performed. The module 1227 may register directly with the base driver 1202 as described above in connection with the previous upgrade example resulting in module 1227's entry points being stored in the descriptor located at address T6. The module 1225 may register directly with the base driver 1202 as described above in connection with the previous upgrade example resulting in module 1225's entry points being stored in the descriptor located at address T5. The modules 1220, 1222, 1224, and 1226 may register with the IFM 1228 and the registered module entry points may have addresses stored in descriptors illustrated by 1208, 1210, 1212, and 1213. Elements 1208, 1210, 1212 and 1213 may represent, respectively, the descriptors for modules 1220, 1222, 1224, and 1226. Descriptors 1208, 1210, 1212, and 1213 may be located, respectively, at address or locations denoted by EPA1, EPA2, EPA3, and EPA4. The IFM 1128 may register EPA1, EPA2, and EPA3 with the base driver 1202 as illustrated by 1204 so that EPA1, EPA2, and EPA3 are located, respectively, at addresses or locations T1, T2, and T3. The IFM 1128 may register EPA4 with the base driver 1202 as illustrated by 1206 so that EPA4 is located at address or location T4. The base driver 1202 may use the information in 1204 and 1206 to facilitate an indirect transfer of control at runtime to a desired extension module entry point when traversing the device stack for I/O processing. In this case, the device stack descriptors may refer to the addresses T1, T2, T3, T4 and/or T6 in a manner similar to that as described and illustrated in FIGS. 6 and 9 in order to provide for runtime transfer of control. It should be noted that in this example, the device stack descriptors may not refer to the address T5 since the common service module in this example includes ancillary functionality as may be used by one of the other extension modules.

Figure 18:
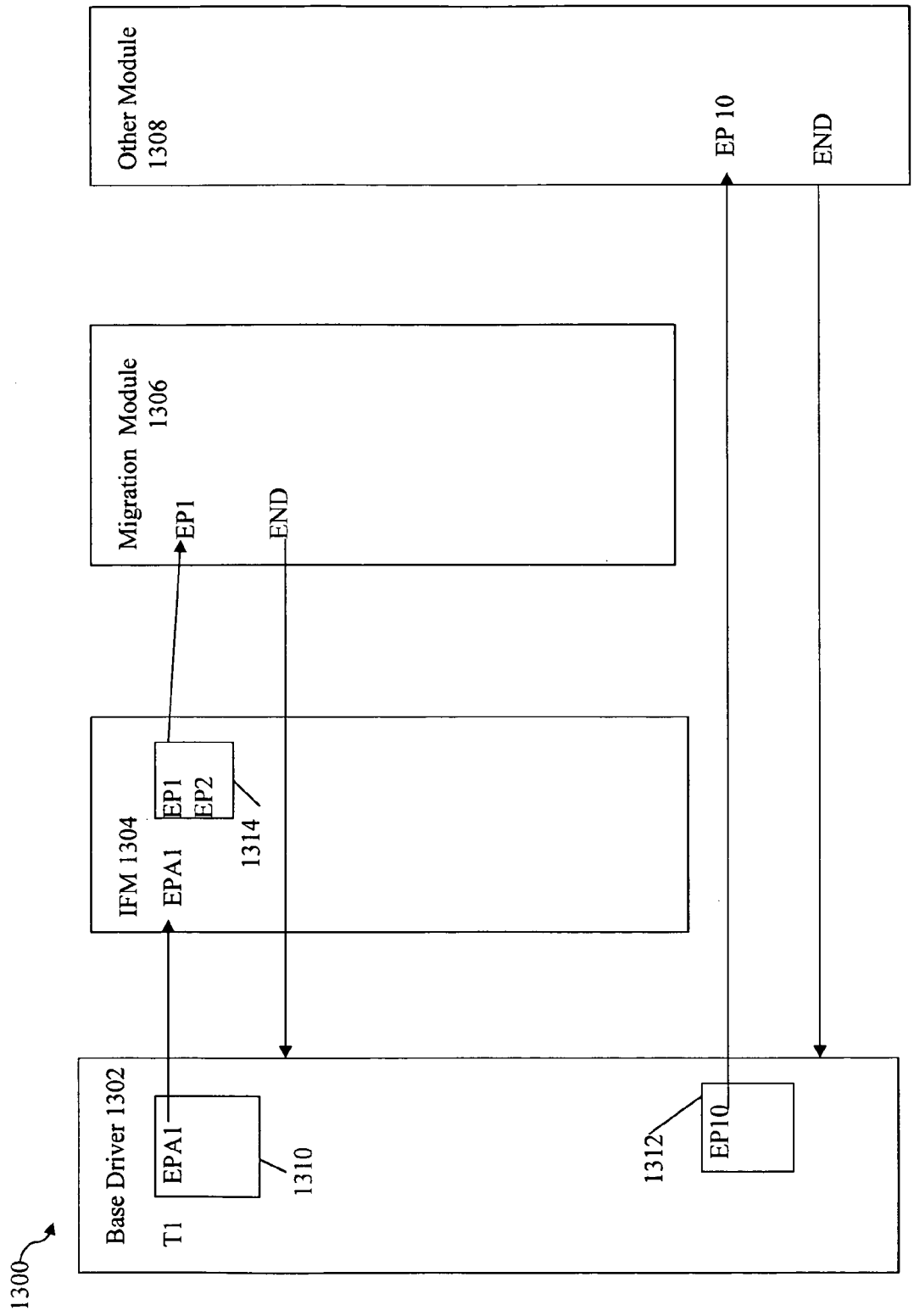

To further illustrate indirect transfer of control provided, reference is made to FIG. 18 where an entry in the device stack at a first level may contain the address T1, which is used to obtain the address EPA1, which is used to obtain the desired entry point EP1, to which runtime control may then be transferred.

Figure 19:
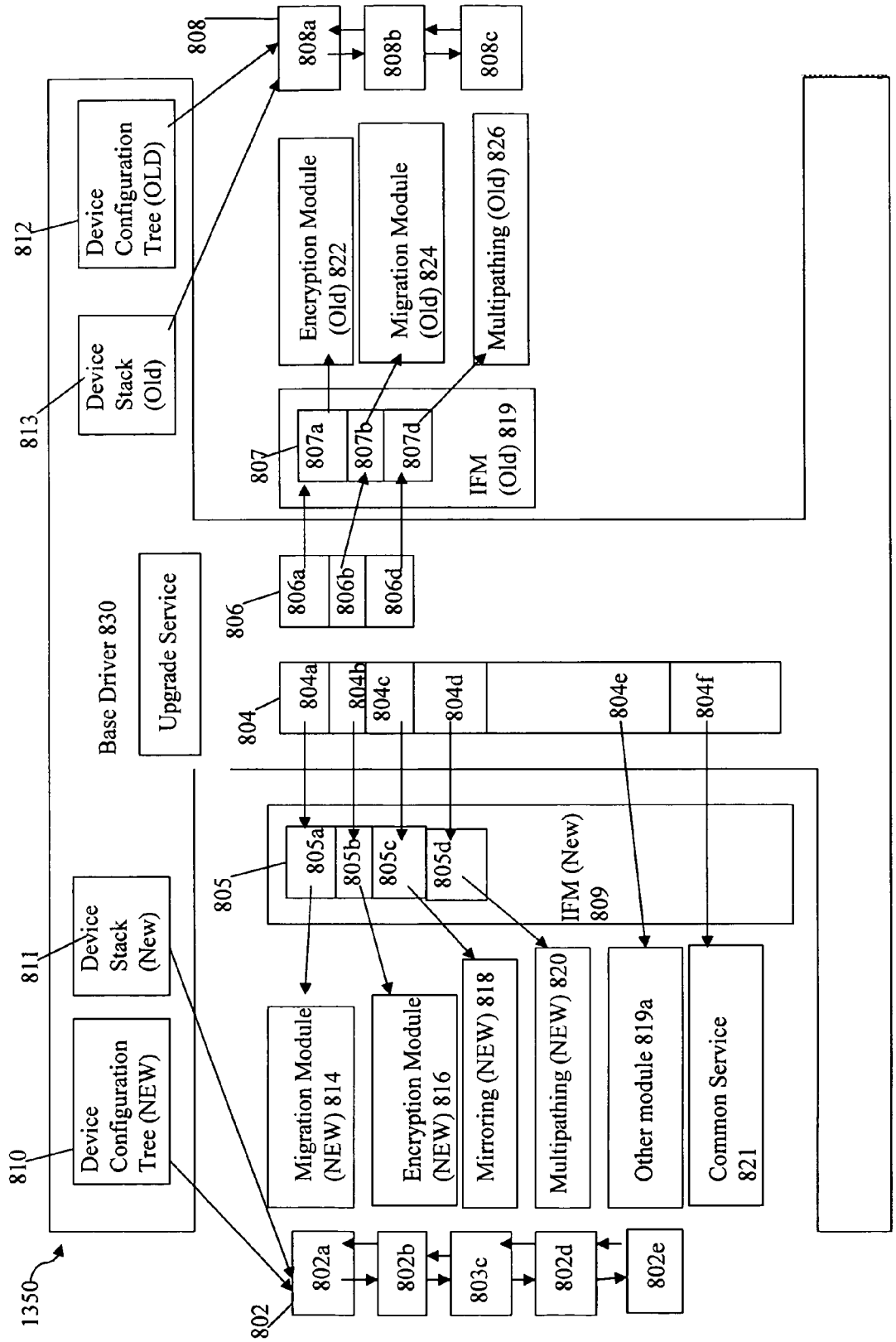

FIG. 19 illustrates a further variation to this example where the IFM and common service module are extension modules. In connection with FIG. 19, the existing or old driver includes the base driver 830 and extension modules 822, 824, 826 and 819. Modules 822, 824 and 826 may be functional extension modules as described an illustrated above. Module 819 is a current or old version of the IFM 819. In the example 1350, the driver upgrade may include upgraded migration module 814, upgraded encryption module 816, upgraded multipath module 820, new common service module 821, new other module 819a and new functional extension module 818 to add mirroring support. Additionally, the driver upgrade includes an upgraded version of the IFM 809. Elements 808 and 802 represent, respectively, the old and new device stacks with an entry for each device stack layer. Elements 804, 805, 806, and 807 represent descriptors. Element 804 includes 804a-d containing registered entry points, respectively, corresponding to addresses of 805a-d. Element 804e includes entry points in module 819a (e.g., directly registered with the base driver). Element 804f includes entry points in module 821 (e.g., directly registered with the base driver). Element 805 includes 805a-d containing registered entry points, respectively, corresponding to addresses in modules 814, 816, 818, and 820. Element 806 includes 806a, 806b and 806d containing registered entry points, respectively, corresponding to addresses of 807a, 807b and 807d. Element 807 includes 807a, 807b, and 807d containing registered entry points, respectively, corresponding to addresses in modules 822, 824 and 826. Processing in accordance with the embodiments described and illustrated in connection with FIGS. 16, 17, 18 and 19 is similar to that as described above, for example, in connection with FIG. 13 with the additional layer of indirect control transfer through the IFM. An embodiment in accordance with techniques herein using the IFM may provide additional upgrade advantages. For example, consider the case where the upgrade includes only replacing one or more existing modules of an old version with corresponding upgraded new modules where all the foregoing one or more modules are registered with IFM providing for indirect transfer of control such as illustrated for the encryption module. In this case, the upgrade processing may use the existing device stack and configuration tree since the device stack includes references or addresses in the IFM.

It should be noted that an embodiment may also include different levels of internal filtering and associated indirect transfer of control rather than just one as described herein. In connection with the upgrade, it should also be noted that modules 819a and 821 may be replacing existing older versions or be new modules which are not replacing a prior version.

The techniques described herein enable upgrade of drivers in a non-disruptive manner with respect to an application performing I/O operations after an initial installation of the driver having the upgrade facility and support. The driver may include a base driver that, once installed, remains in the kernel all the time and functionality included in the base driver remains unchanged. After an upgraded version of the driver is loaded where the upgrade includes one or more upgraded driver extension modules, two versions of the driver are in the kernel. Both versions of the driver may be active or in use during the upgrade process and device by device cutover processing is performed and in progress. The driver will suspend I/Os, unconfigure the old devices and configure the new devices one by one and redirect the I/Os to use the new driver and its associate configuration tree and device stack. When cut-over processing is complete for all devices, driver modules of the old version prior to upgrade not in use with the upgraded driver may be unloaded.

It should be noted that problems may be encountered in connection with namespaces used for modules, variables, routines, and the like, with the techniques herein. For example, a same module name may not be used in connection with a first version of a first module and a second upgraded version of the first module. Thus, an embodiment may utilize any one or more different suitable techniques to resolve such namespace issues. For example, an embodiment may alternate between two sets of names for modules, variables, routines, and the like, between subsequent upgrades. Code of the driver may be aware of the foregoing and perform appropriate processing to recognize and utilize equivalent modules, routines, variables, and the like, as may be renamed in an upgrade.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of upgrading a driver comprising:
    installing a driver, said driver including an upgrade facility, a base driver and a first set of one or more driver extension modules for processing input/output operations for one or more devices, said driver using a first device configuration tree and first device stack in connection with processing input/output operations for said one or more devices with said first set of one or more driver extension modules corresponding to a first version of said driver;
    performing processing to upgrade said driver using said upgrade facility, said processing including:
        loading one or more upgrade modules associated with a second version of said driver; and
        performing cutover processing for each of said one or more devices and wherein, prior to completing said cutover processing for a first of said one or more devices, input/output operations directed to said first device are processed using said first device configuration tree and said first device stack with said first set of one or more driver extension modules corresponding to a first version of said driver, and after completing said cutover processing for said first device, input/output operations directed to said first device are processed using a second device configuration tree and a second device stack with a second set of driver extension modules, said second set including said one or more upgrade modules and being associated with said second version of said driver, wherein, while said processing is being performed to upgrade said driver and prior to completing said cutover processing for said one or more devices, entry points for said second set of one or more driver extension modules are registered with said base driver for at least one time period during the cutover processing that overlaps with a time period during which entry points for said first set of one or more driver extension modules are registered with said base driver thereby allowing said base driver to transfer control to both said first version and said second version of the driver prior to completing said cutover processing for said one or more devices, and wherein, during the at least one time period during the cutover processing that the entry points for both the first set of one or more driver extension modules and the second set of driver extension modules are registered with the base driver, both the first version of the driver and the second version of the driver are active or in use at the same time.

2. The method of claim 1, wherein said processing to upgrade said driver includes replacing a first of said driver extension modules in said first set with an upgraded first extension module.

3. The method of claim 1, wherein said processing to upgrade said driver includes adding an extension module which does not replace a corresponding extension module included in said first set.

4. The method of claim 1, wherein a first of said upgrade modules is an internal filtering module which directs input/output operations for said one or more devices within said driver through said second device stack.

5. The method of claim 1, wherein said driver is installed in a kernel of a computer system.

6. The method of claim 1, further comprising:
    issuing a command from user mode to request said performing processing to upgrade said driver using said upgrade facility.

7. The method of claim 1, wherein upgrade state information is maintained regarding an upgrade state of said driver.

8. The method of claim 7, wherein said upgrade state information indicates whether a driver upgrade is in progress.

9. The method of claim 8, wherein, if said upgrade state information indicates that an upgrade is in progress, changes to static configuration data are suspended.

10. The method of claim 7, wherein said upgrade state information indicates whether cutover processing is in progress for each of said one or more devices.

11. The method of claim 7, wherein said upgrade state information indicates whether input/output operations for each of said one or more devices are suspended.

12. The method of claim 7, wherein said upgrade state information indicates whether to use said first device configuration tree and said first device stack or said second device configuration tree and said second device stack when processing input/output operations for each of said one or more devices.

13. The method of claim 1, wherein said cutover processing for said first device includes suspending input/output operations for said first device, draining input/output operations for said first device which use said first configuration tree and said first device stack, obtaining and updating runtime device configuration information for said first device, and resuming input/output operations for said first device using said second device configuration tree and said second device stack with said second set of driver extension modules.

14. The method of claim 1, wherein said first set of one or more driver extension modules includes an internal filtering module which directs input/output operations for said one or more devices within said driver through said first device stack.

15. The method of claim 14, wherein said first set includes a first driver extension module which registers with said internal filtering module enabling said internal filtering module to transfer control to said first driver extension module in connection with processing input/output operations for said one or more devices.

16. The method of claim 14, wherein said internal filtering module registers with said base driver enabling said base driver to transfer control to said internal filtering module when processing input/output operations for said one or more devices.

17. The method of claim 1, wherein resources for said first device stack and said first configuration tree are deallocated after completing said cutover processing for said one or more devices.

18. The method of claim 17, further comprising unloading modules of said first set which are no longer in use in connection with said second version of said driver after upgrade of said driver to said second version is complete.

19. A computer readable medium comprising code stored thereon for upgrading a driver, the computer readable medium comprising code stored thereon for:

installing a driver, said driver including an upgrade facility, a base driver and a first set of one or more driver extension modules for processing input/output operations for one or more devices, said driver using a first device configuration tree and first device stack in connection with processing input/output operations for said one or more devices with said first set of one or more driver extension modules corresponding to a first version of said driver;

performing processing to upgrade said driver using said upgrade facility, said processing including:

loading one or more upgrade modules associated with a second version of said driver; and performing cutover processing for each of said one or more devices and wherein, prior to completing said cutover processing for a first of said one or more devices, input/output operations directed to said first device are processed using said first device configuration tree and said first device stack with said first set of one or more driver extension modules corresponding to a first version of said driver, and after completing said cutover processing for said first device, input/output operations directed to said first device are processed using a second device configuration tree and a second device stack with a second set of driver extension modules, said second set including said one or more upgrade modules and being associated with said second version of said driver, wherein, while said processing is being performed to upgrade said driver and prior to completing said cutover processing for said one or more devices, entry points for said second set of one or more driver extension modules are registered with said base driver for at least one time period during the cutover processing that overlaps with a time period during which entry points for said first set of one or more driver extension modules are registered with said base driver thereby allowing said base driver to transfer control to both said first version and said second version of the driver prior to completing said cutover processing for said one or more devices, and wherein, during the at least one time period during the cutover processing that the entry points for both the first set of one or more driver extension modules and the second set of driver extension modules are registered with the base driver, both the first version of the driver and the second version of the driver are active or in use at the same time.

20. The computer readable medium of claim 19, wherein said processing to upgrade said driver includes replacing a first of said driver extension modules in said first set with an upgraded first extension module.

* * * * *